United States Patent
Glew et al.

(10) Patent No.: US 9,798,873 B2
(45) Date of Patent: *Oct. 24, 2017

(54) PROCESSOR OPERABLE TO ENSURE CODE INTEGRITY

(75) Inventors: Andrew F. Glew, Hillsboro, WA (US);
Daniel A. Gerrity, Seattle, WA (US);
Clarence T. Tegreene, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/136,670

(22) Filed: Aug. 4, 2011
(Under 37 CFR 1.47)

(65) Prior Publication Data
US 2013/0036464 A1    Feb. 7, 2013

(51) Int. Cl.
| G06F 21/00 | (2013.01) |
| G06F 9/00 | (2006.01) |
| G06F 21/52 | (2013.01) |
| G06F 9/32 | (2006.01) |
| G06F 21/50 | (2013.01) |
| G06F 21/71 | (2013.01) |

(52) U.S. Cl.
CPC .............. *G06F 21/52* (2013.01); *G06F 9/32* (2013.01); *G06F 9/322* (2013.01); *G06F 21/50* (2013.01); *G06F 21/71* (2013.01)

(58) Field of Classification Search
CPC .......... G06F 21/50; G06F 21/52; G06F 21/54; G06F 21/71
USPC ...................................... 726/22–24
See application file for complete search history.

(56) References Cited

U.S. PATENT DOCUMENTS

| 4,087,856 | A | * | 5/1978 | Attanasio | ............ G06F 12/1491 711/E12.097 |
| 4,525,599 | A | | 6/1985 | Curran et al. | |
| 5,437,032 | A | | 7/1995 | Wolf et al. | |
| 5,623,637 | A | | 4/1997 | Jones et al. | |
| 6,006,328 | A | | 12/1999 | Drake | |
| 6,057,598 | A | | 5/2000 | Payne et al. | |
| 6,145,064 | A | | 11/2000 | Long et al. | |
| 6,154,741 | A | | 11/2000 | Feldman | |
| 6,199,055 | B1 | | 3/2001 | Kara et al. | |
| 6,205,544 | B1 | * | 3/2001 | Mills | ....................... G06F 9/321 712/230 |
| 6,584,488 | B1 | | 6/2003 | Brenner et al. | |

(Continued)

FOREIGN PATENT DOCUMENTS

| WO | WO 01/99075 A2 | 12/2001 |

OTHER PUBLICATIONS

Adya et al.; "FARSITE: Federated, Available, and Reliable Storage for an Incompletely Trusted Environment"; 5th Symposium on Operating Systems Design and Implementation; bearing a date of Dec. 2002; pp. 1-14; Boston, MA.

(Continued)

*Primary Examiner* — Linglan Edwards

(57) ABSTRACT

A processor can be used to ensure that program code can only be used for a designed purpose and not exploited by malware. Embodiments of an illustrative processor can comprise logic operable to execute a program instruction and to distinguish whether the program instruction is a legitimate branch instruction or a non-legitimate branch instruction.

29 Claims, 22 Drawing Sheets

(56) References Cited

U.S. PATENT DOCUMENTS

| | | |
|---|---|---|
| 6,654,745 B2 | 11/2003 | Feldman |
| 6,996,547 B1 | 2/2006 | Tugenberg et al. |
| 7,035,277 B1 | 4/2006 | Batcher |
| 7,054,190 B2 | 5/2006 | Hanyu et al. |
| 7,069,447 B1 | 6/2006 | Corder |
| 7,093,250 B1 | 8/2006 | Rector |
| 7,107,176 B2 | 9/2006 | Henry et al. |
| 7,124,170 B1 | 10/2006 | Sibert |
| 7,165,150 B2 | 1/2007 | Alverson et al. |
| 7,191,185 B2 | 3/2007 | Dweck et al. |
| 7,221,600 B2 | 5/2007 | Hara et al. |
| 7,284,000 B2 | 10/2007 | Kuehr-McLaren et al. |
| 7,379,999 B1 | 5/2008 | Zhou et al. |
| 7,395,414 B2 | 7/2008 | Le et al. |
| 7,502,946 B2 | 3/2009 | Perkins et al. |
| 7,533,242 B1 | 5/2009 | Moll et al. |
| 7,533,273 B2 | 5/2009 | Patariu et al. |
| 7,549,054 B2 | 6/2009 | Brodie et al. |
| 7,577,992 B2 * | 8/2009 | Abadi .............. G06F 21/52 726/22 |
| 7,594,111 B2 | 9/2009 | Kiriansky et al. |
| 7,620,941 B1 | 11/2009 | Leventhal |
| 7,644,162 B1 | 1/2010 | Zhu et al. |
| 7,676,578 B1 | 3/2010 | Zhu et al. |
| 7,708,195 B2 | 5/2010 | Yoshida et al. |
| 7,757,282 B2 | 7/2010 | Pandit et al. |
| 7,823,135 B2 * | 10/2010 | Horning .............. G06F 21/14 713/187 |
| 7,844,733 B2 | 11/2010 | Betts et al. |
| 7,861,305 B2 | 12/2010 | McIntosh et al. |
| 7,870,610 B1 | 1/2011 | Mitchell et al. |
| 7,873,998 B1 | 1/2011 | Wilkinson et al. |
| 7,877,585 B1 | 1/2011 | Coon et al. |
| 7,953,986 B2 | 5/2011 | Lee |
| 7,958,370 B2 | 6/2011 | Hirai et al. |
| 7,958,558 B1 | 6/2011 | Leake et al. |
| 8,022,724 B1 | 9/2011 | Jenkins, IV |
| 8,056,138 B2 * | 11/2011 | Jin .............. G06F 21/125 726/26 |
| 8,099,574 B2 | 1/2012 | Savagaonkar et al. |
| 8,136,091 B2 * | 3/2012 | Erlingsson .......... G06F 12/1441 713/151 |
| 8,136,158 B1 | 3/2012 | Sehr et al. |
| 8,146,106 B2 | 3/2012 | Kim et al. |
| 8,281,388 B1 | 10/2012 | Sobel et al. |
| 8,286,250 B1 | 10/2012 | Le et al. |
| 8,312,509 B2 | 11/2012 | Zimmer et al. |
| 8,381,192 B1 | 2/2013 | Drewry et al. |
| 8,397,238 B2 | 3/2013 | Venkumahanti et al. |
| 8,473,754 B2 | 6/2013 | Jones et al. |
| 8,510,827 B1 | 8/2013 | Leake et al. |
| 8,516,583 B2 | 8/2013 | Thomas et al. |
| 8,555,390 B2 | 10/2013 | Thiebeauld De La Crouee et al. |
| 8,561,183 B2 * | 10/2013 | Muth .............. G06F 21/52 717/124 |
| 8,621,144 B2 | 12/2013 | Eschmann et al. |
| 8,675,868 B1 | 3/2014 | Yearsley et al. |
| 8,683,581 B2 | 3/2014 | Lefloch |
| 8,688,583 B2 | 4/2014 | Boccon-Gibod et al. |
| 8,694,947 B1 | 4/2014 | Venkataramani et al. |
| 8,732,431 B2 | 5/2014 | Culley et al. |
| 9,104,895 B2 | 8/2015 | Martini |
| 2002/0040420 A1 | 4/2002 | Yamauchi et al. |
| 2002/0075844 A1 | 6/2002 | Hagen |
| 2002/0141577 A1 | 10/2002 | Ripley et al. |
| 2002/0142833 A1 | 10/2002 | Tsuchida et al. |
| 2002/0152212 A1 | 10/2002 | Feldman |
| 2002/0156939 A1* | 10/2002 | Armstrong et al. ........... 709/400 |
| 2002/0166058 A1 | 11/2002 | Fueki |
| 2003/0046238 A1 | 3/2003 | Nonaka et al. |
| 2003/0084308 A1 | 5/2003 | Van Rijnswou |
| 2003/0088759 A1* | 5/2003 | Wilkerson ................ 712/218 |
| 2003/0149869 A1 | 8/2003 | Gleichauf |
| 2003/0159070 A1 | 8/2003 | Mayer et al. |
| 2003/0182436 A1 | 9/2003 | Henry |
| 2003/0187974 A1* | 10/2003 | Burbeck et al. ............ 709/224 |
| 2003/0188132 A1* | 10/2003 | Keltcher .............. G06F 9/30101 712/215 |
| 2004/0054925 A1 | 3/2004 | Etheridge et al. |
| 2004/0059934 A1 | 3/2004 | Kohiyama et al. |
| 2004/0088691 A1* | 5/2004 | Hammes et al. ............. 717/158 |
| 2004/0116183 A1 | 6/2004 | Prindle |
| 2004/0117639 A1 | 6/2004 | Mowery |
| 2004/0117790 A1 | 6/2004 | Rhine |
| 2004/0153318 A1 | 8/2004 | Chamberlain |
| 2004/0199763 A1 | 10/2004 | Freund |
| 2005/0004924 A1 | 1/2005 | Baldwin |
| 2005/0060710 A1 | 3/2005 | Kush |
| 2005/0081207 A1 | 4/2005 | Hoflehner et al. |
| 2005/0125613 A1 | 6/2005 | Kim et al. |
| 2005/0125793 A1 | 6/2005 | Aguilar et al. |
| 2005/0138074 A1 | 6/2005 | O'Connor et al. |
| 2005/0160428 A1 | 7/2005 | Ayachitula et al. |
| 2005/0171903 A1 | 8/2005 | Yacobi et al. |
| 2005/0177596 A1* | 8/2005 | Wu et al. .................. 707/104.1 |
| 2005/0195975 A1 | 9/2005 | Kawakita |
| 2005/0213751 A1 | 9/2005 | Apostolopoulos et al. |
| 2005/0232415 A1 | 10/2005 | Little et al. |
| 2005/0268075 A1 | 12/2005 | Caprioli et al. |
| 2006/0005082 A1 | 1/2006 | Fossum et al. |
| 2006/0021054 A1 | 1/2006 | Costa et al. |
| 2006/0025952 A1 | 2/2006 | Buhr |
| 2006/0161715 A1 | 7/2006 | Hamaguchi |
| 2006/0161978 A1* | 7/2006 | Abadi .............. G06F 21/52 726/22 |
| 2006/0184767 A1 | 8/2006 | Le et al. |
| 2006/0195906 A1* | 8/2006 | Jin .............. G06F 21/125 726/26 |
| 2006/0289659 A1 | 12/2006 | Mizushima |
| 2007/0022287 A1 | 1/2007 | Beck et al. |
| 2007/0050477 A1 | 3/2007 | Isaacs |
| 2007/0079304 A1 | 4/2007 | Zheng et al. |
| 2007/0101433 A1 | 5/2007 | Louch et al. |
| 2007/0240215 A1 | 10/2007 | Flores et al. |
| 2007/0250837 A1 | 10/2007 | Herington et al. |
| 2008/0005586 A1 | 1/2008 | Munguia |
| 2008/0028467 A1 | 1/2008 | Kommareddy et al. |
| 2008/0052539 A1 | 2/2008 | MacMillan et al. |
| 2008/0052541 A1 | 2/2008 | Ginter et al. |
| 2008/0104004 A1 | 5/2008 | Brave et al. |
| 2008/0114990 A1 | 5/2008 | Hilbert et al. |
| 2008/0127335 A1 | 5/2008 | Khan et al. |
| 2008/0168279 A1 | 7/2008 | Kanai |
| 2008/0184016 A1 | 7/2008 | Erlingsson et al. |
| 2008/0222397 A1* | 9/2008 | Wilkerson et al. ........... 712/220 |
| 2008/0222532 A1 | 9/2008 | Mester et al. |
| 2008/0250216 A1* | 10/2008 | Kershaw et al. ............. 711/163 |
| 2008/0256346 A1 | 10/2008 | Lee et al. |
| 2008/0263663 A1 | 10/2008 | Ide et al. |
| 2008/0276317 A1 | 11/2008 | Chandola et al. |
| 2008/0279371 A1 | 11/2008 | Lee et al. |
| 2008/0288785 A1 | 11/2008 | Rao et al. |
| 2008/0301467 A1 | 12/2008 | Saito |
| 2008/0313482 A1 | 12/2008 | Karlapalem et al. |
| 2008/0320565 A1 | 12/2008 | Buch et al. |
| 2009/0006755 A1 | 1/2009 | Illikkal et al. |
| 2009/0007125 A1 | 1/2009 | Barsness et al. |
| 2009/0028135 A1 | 1/2009 | Mantripragada et al. |
| 2009/0038014 A1 | 2/2009 | Force et al. |
| 2009/0063824 A1* | 3/2009 | Leaback et al. ............. 712/216 |
| 2009/0070338 A1 | 3/2009 | Spitzig et al. |
| 2009/0083520 A1 | 3/2009 | Kanemura |
| 2009/0106563 A1 | 4/2009 | Cherpantier |
| 2009/0144557 A1 | 6/2009 | Sutton |
| 2009/0172056 A1 | 7/2009 | Pradhan et al. |
| 2009/0172686 A1 | 7/2009 | Chen et al. |
| 2009/0183263 A1 | 7/2009 | McMichael et al. |
| 2009/0187743 A1* | 7/2009 | Greenhalgh ........ G06F 9/30145 712/213 |
| 2009/0187771 A1 | 7/2009 | McLellan, Jr. |
| 2009/0210881 A1 | 8/2009 | Duller |
| 2009/0222910 A1 | 9/2009 | Le Bihan et al. |
| 2009/0265712 A1 | 10/2009 | Herington |

(56) References Cited

U.S. PATENT DOCUMENTS

| | | |
|---|---|---|
| 2009/0282474 A1 | 11/2009 | Chen et al. |
| 2009/0288090 A1 | 11/2009 | Ujibashi et al. |
| 2009/0320129 A1 | 12/2009 | Pan et al. |
| 2009/0320136 A1* | 12/2009 | Lambert et al. ............... 726/25 |
| 2009/0327718 A1 | 12/2009 | Hirai |
| 2010/0017638 A1 | 1/2010 | Ghose |
| 2010/0042824 A1 | 2/2010 | Lee et al. |
| 2010/0131957 A1 | 5/2010 | Kami |
| 2010/0165991 A1 | 7/2010 | Veal et al. |
| 2010/0191349 A1 | 7/2010 | Munaga |
| 2010/0269168 A1 | 10/2010 | Hegli et al. |
| 2010/0281273 A1 | 11/2010 | Lee et al. |
| 2010/0299305 A1 | 11/2010 | Laxman et al. |
| 2010/0318998 A1 | 12/2010 | Golla |
| 2011/0029140 A1 | 2/2011 | Jordan et al. |
| 2011/0066896 A1 | 3/2011 | Ebina et al. |
| 2011/0072292 A1 | 3/2011 | Khawand et al. |
| 2011/0129024 A1 | 6/2011 | Karthik et al. |
| 2011/0131402 A1* | 6/2011 | Mittal ............................... 713/2 |
| 2011/0131550 A1 | 6/2011 | Burckhardt et al. |
| 2011/0131658 A1 | 6/2011 | Bahl |
| 2011/0138124 A1* | 6/2011 | Hill et al. ..................... 711/122 |
| 2011/0138473 A1* | 6/2011 | Yee et al. ........................ 726/26 |
| 2011/0179176 A1 | 7/2011 | Ravichandran et al. |
| 2011/0202927 A1 | 8/2011 | Miloushev et al. |
| 2011/0289586 A1 | 11/2011 | Kc et al. |
| 2011/0296440 A1 | 12/2011 | Laurich et al. |
| 2011/0307382 A1 | 12/2011 | Siegel et al. |
| 2011/0314254 A1 | 12/2011 | Smriti et al. |
| 2011/0320788 A1 | 12/2011 | Assarpour |
| 2011/0320793 A1 | 12/2011 | Bell, Jr. et al. |
| 2012/0079492 A1 | 3/2012 | Chambliss et al. |
| 2012/0102489 A1 | 4/2012 | Staiman et al. |
| 2012/0110292 A1 | 5/2012 | Martini |
| 2012/0159183 A1 | 6/2012 | Adams et al. |
| 2012/0179952 A1 | 7/2012 | Tuyls et al. |
| 2012/0185863 A1 | 7/2012 | Krstic et al. |
| 2012/0210325 A1 | 8/2012 | de Lind Van Wijngaarden et al. |
| 2012/0221591 A1 | 8/2012 | Yerneni et al. |
| 2012/0233698 A1 | 9/2012 | Watters et al. |
| 2012/0255018 A1* | 10/2012 | Sallam ............................ 726/24 |
| 2012/0255021 A1 | 10/2012 | Sallam |
| 2012/0265975 A1* | 10/2012 | Kimelman ........................ 713/1 |
| 2012/0266243 A1* | 10/2012 | Turkulainen .................... 726/24 |
| 2012/0278903 A1 | 11/2012 | Pugh |
| 2013/0024867 A1 | 1/2013 | Glew et al. |
| 2013/0081039 A1 | 3/2013 | Glew et al. |
| 2013/0086687 A1 | 4/2013 | Chess et al. |
| 2013/0111489 A1 | 5/2013 | Glew et al. |
| 2013/0111491 A1 | 5/2013 | Glew et al. |
| 2013/0246605 A1 | 9/2013 | Mahadik et al. |
| 2013/0305243 A1 | 11/2013 | Hiki |
| 2014/0245449 A1 | 8/2014 | Powell et al. |

OTHER PUBLICATIONS

Kolbitsch et al.; "Extending Mondrian Memory Protection"; Information Systems and Technology Panel (IST) Symposium, Tallinn, Estonia; bearing a date of Nov. 22-23, 2010; pp. 10-1 through 10-18 and 1 Report Documentation Page; NATO-OTAN.
Stone, Harold S.; "A Logic-in-Memory Computer"; IEEE Transactions on Computers; bearing a date of Jan. 1970; pp. 73-78.
Bird et al.; "Lighthouse: Hardware Support for Enforcing Information Flow Control on ManyCore Systems"; bearing a date of 2008 (as provided by examiner); 10 pages.
Clause et al.; "Dytan: A Generic Dynamic Taint Analysis Framework"; ISSTA '07; bearing a date of Jul. 9-12, 2007; pp. 196-206; ACM.
Ho et al.; "Practical Taint-Based Protection using Demand Emulation"; EuroSys '06; bearing a date of Apr. 18-21, 2006; 13 pages; ACM.
Newsome et al.; "Dynamic Taint Analysis for Automation Detection, Analysis, and Signature Generation of Exploits on Commodity Software"; Carnegie Mellon University Research Showcase; bearing a date of Jan. 1, 2005; 18 pages.
Schwartz et al.; "All You Ever Wanted to Know About Dynamic Taint Analysis and Forward Symbolic Execution (but might have been afraid to ask)"; 2010 IEEE Symposium on Security and Privacy; bearing a date of 2010; pp. 317-331; IEEE.
Song et al.; "BitBlaze: A New Approach to Computer Security via Binary Analysis"; ICISS 2008; bearing a date of 2008; pp. 1-25; Springer-Verlag Berlin Heidelberg.
Yin et al.; "Panorama: Capturing System-wide Information Flow for Malware Detection and Analysis"; CCS '07; bearing a date of Oct. 29-Nov. 2, 2007; pp. 116-127; ACM.
Zeldovich et al.; "Hardware Enforcement of Application Security Policies Using Tagged Memory"; bearing a date of 2008 (as provided by examiner), printed Feb. 7, 2013; pp. 1-16; located at: http://static.usenix.org/events/osdi08/tech/full_papers/zeidovich/zeidovich_html/.
Zhang et al.; "Neon: System Support for Derived Data Management"; VEE '10; bearing a date of Mar. 17-19, 2010; 12 pages; ACM.
Abadi et al.; "Control-Flow Integrity: Principles, Implementations, and Applications"; bearing a date of Nov. 1, 2004; pp. 1-33.
Kiriansky et al.; "Secure Execution Via Program Shepherding"; Proceedings of the 11th USENIX Security Symposium; bearing a date of Aug. 2002, created on Dec. 9, 2013; pp. 1-16; San Francisco, CA.
"Instruction Set"; Wikipedia; bearing a date of May 15, 2010; pp. 1-10; located at: https://en.wikipedia.org/wiki/Instruction_set.
"Opcode"; Wikipedia; bearing a date of Oct. 26, 2014; pp. 1-2; located at: http://en.wikipedia.org/w/index.php?title=Opcode&oldid=175723708.
Chen et al.; "Log-Based Architectures for General-Purpose Monitoring of Deployed Code"; bearing a date of Oct. 21, 2006; 3 pages; ACM.
Realtime Privacy Monitoring on Smartphones; located at http://apparialysis.org; (retrieved on Oct. 8, 2015) created on Dec. 2, 2015; pp. 1-2.
Enck et al.; "TaintDroid: An Information-Flow Tracking System for Realtime Privacy Monitoring on Smartphones"; Proceedings of the 9th USENIX Symposium on Operating Systems Design and Implementation (OSDI), Oct. 2010. Vancouver, BC.; created on Dec. 2, 2015; pp. 1-15.
Bachrach et al.; "Distributed Multiagent Resource Allocation Diminishing Marginal Return Domains"; Proc. Of 7th Int. Conf. on Autonomous Agents and Multiagent Systems (AAMAS 2008); bearing a date of May 12-16, 2008; pp. 1103-1110; located at: www.ifaamas.org.
"Imation Mobile Security"; Imation Corp; bearing a date of Oct. 2015; pp. 1-4; located at: http://www.ironkey.com/en-US/resources/documnts/IronKey_ProductFamily_US.pdf.
Rajput, Dhanraj; "Designing Secure USB-Based Dongles"; bearing a date of Dec. 2011; Cypress Semiconductor Corporation; pp. 1-7; EE Times Industrial Control; located at: http://www.cypress.com/file/110461/download.
Liu et al.; "Adaptive Entitlement Control of Resource Containers on Shared Servers"; bearing a date of 2005; pp. 163-176; IEEE.
Liu et al.; "Optimal Multivariate Control for Differentiated Services on a Shared Hosting Platform"; Proceedings of the 46th IEEE Conference on Decision and Control; hearing a date of Dec. 12-14, 2007; pp. 3792-3799; IEEE.
Wang et al; "AppRAISE: Application-Level Performance Management in Virtualized Server Environments"; bearing a date of Dec. 2009; pp. 240-254; vol. 6, No. 4; IEEE.

* cited by examiner

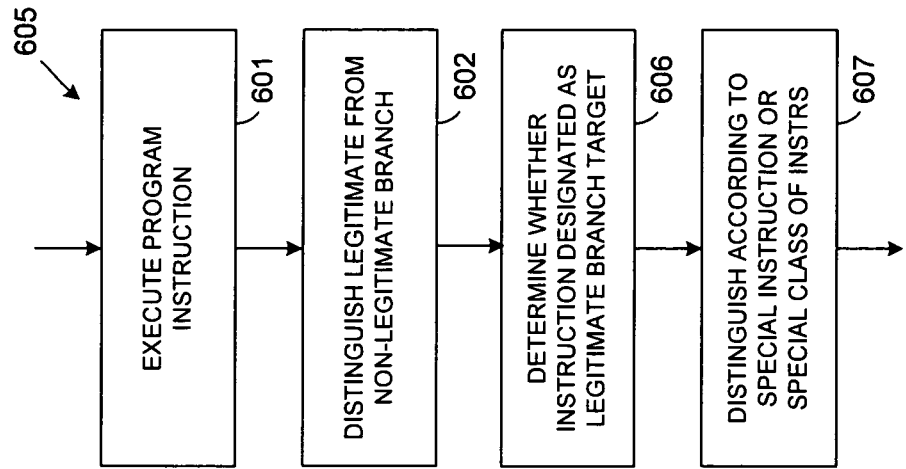
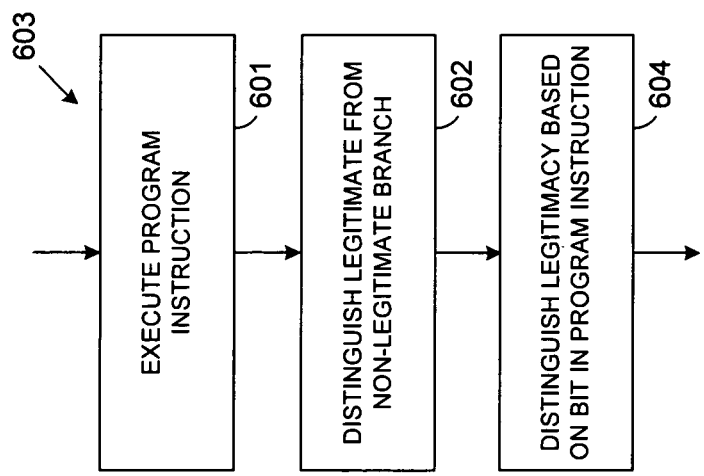
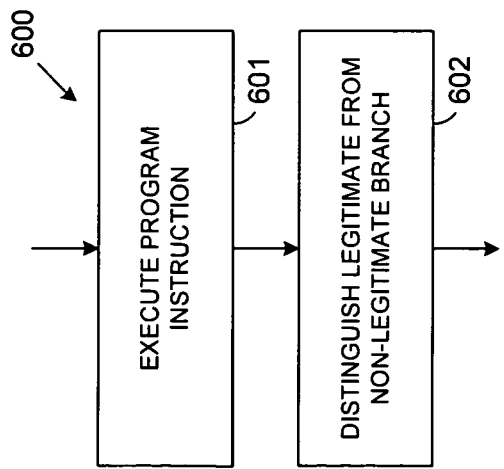

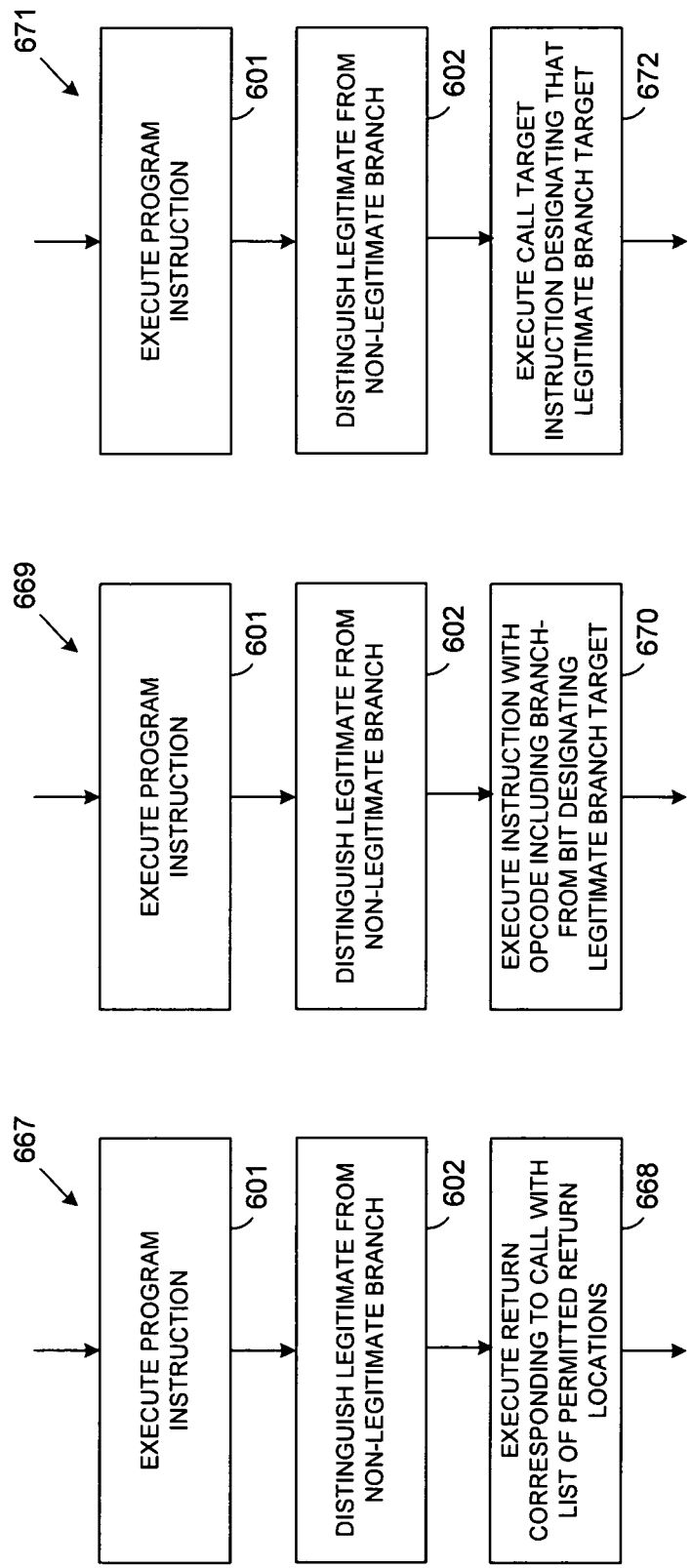

PROCESSOR OPERABLE TO ENSURE CODE INTEGRITY

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements:
(1) the present application constitutes a continuation-in-part of U.S. patent application Ser. No. 13/136,024, entitled "CONTROL FLOW INTEGRITY", naming Andrew F. Glew, Daniel A. Gerrity, and Clarence T. Tegreene, as inventors, filed Jul. 19, 2011, which is currently co-pending, or is an application of which a currently co-pending application is entitled to the benefit of the filing date;
(2) the present application constitutes a continuation-in-part of U.S. patent application Ser. No. 13/136,401, entitled "FINE-GRAINED SECURITY IN FEDERATED DATA SETS" naming Andrew F. Glew, Daniel A. Gerrity, and Clarence T. Tegreene, as inventors, filed Jul. 29, 2011, which is currently co-pending, or is an application of which a currently co-pending application is entitled to the benefit of the filing date;
(3) the present application constitutes a continuation-in-part of U.S. patent application Ser. No. 13/136,400, entitled "ENCRYPTED MEMORY" naming Andrew F. Glew, Daniel A. Gerrity, and Clarence T. Tegreene, as inventors, filed Jul. 29, 2011, which is currently co-pending, or is an application of which a currently co-pending application is entitled to the benefit of the filing date; and
(4) the present application constitutes a continuation-in-part of U.S. patent application Ser. No. 13/136,666, entitled "SECURITY PERIMETER" naming Andrew F. Glew, Daniel A. Gerrity, and Clarence T. Tegreene, as inventors, filed Aug. 4, 2011, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

BACKGROUND

Malicious software, also called malware, refers to programming (code, scripts, active content, and other software) designed to disrupt or deny operation, gather information to violate privacy or exploitation, gain unauthorized access to system resources, and enable other abusive behavior. The expression is a general term used by computer professionals to mean a variety of forms of hostile, intrusive, or annoying software or program code.

Malware includes various software including computer viruses, worms, Trojan horses, spyware, dishonest adware, scareware, crimeware, rootkits, and other malicious and unwanted software or program, and is considered to be malware based on the perceived intent of the creator rather than any particular features. In legal terms, malware is sometimes termed as a "computer contaminant," for example in the legal codes of U.S. states such as California.

SUMMARY

A processor can be used to ensure that program code can only be used for a designed purpose and not exploited by malware. Embodiments of an illustrative processor can comprise logic operable to execute a program instruction and to distinguish whether the program instruction is a legitimate branch instruction or a non-legitimate branch instruction.

BRIEF DESCRIPTION OF THE DRAWINGS

Embodiments of the invention relating to both structure and method of operation may best be understood by referring to the following description and accompanying drawings:

FIGS. 6A, 6B, 6C, 6D, 6E, 6F, 6G, 6H, 6I, 6J, 6K, 6L, 6M, 6N, 6O, 6P, 6Q, 6R, 6S, 6T, 6U, 6V, 6W, 6X, 6Y, 6Z, 6AA, and 6BB are schematic flow charts depicting an embodiment or embodiments of a method for ensuring program code can only be used for a designed purpose and not exploited by malware in a data processing system.

DETAILED DESCRIPTION

Figure 1A:
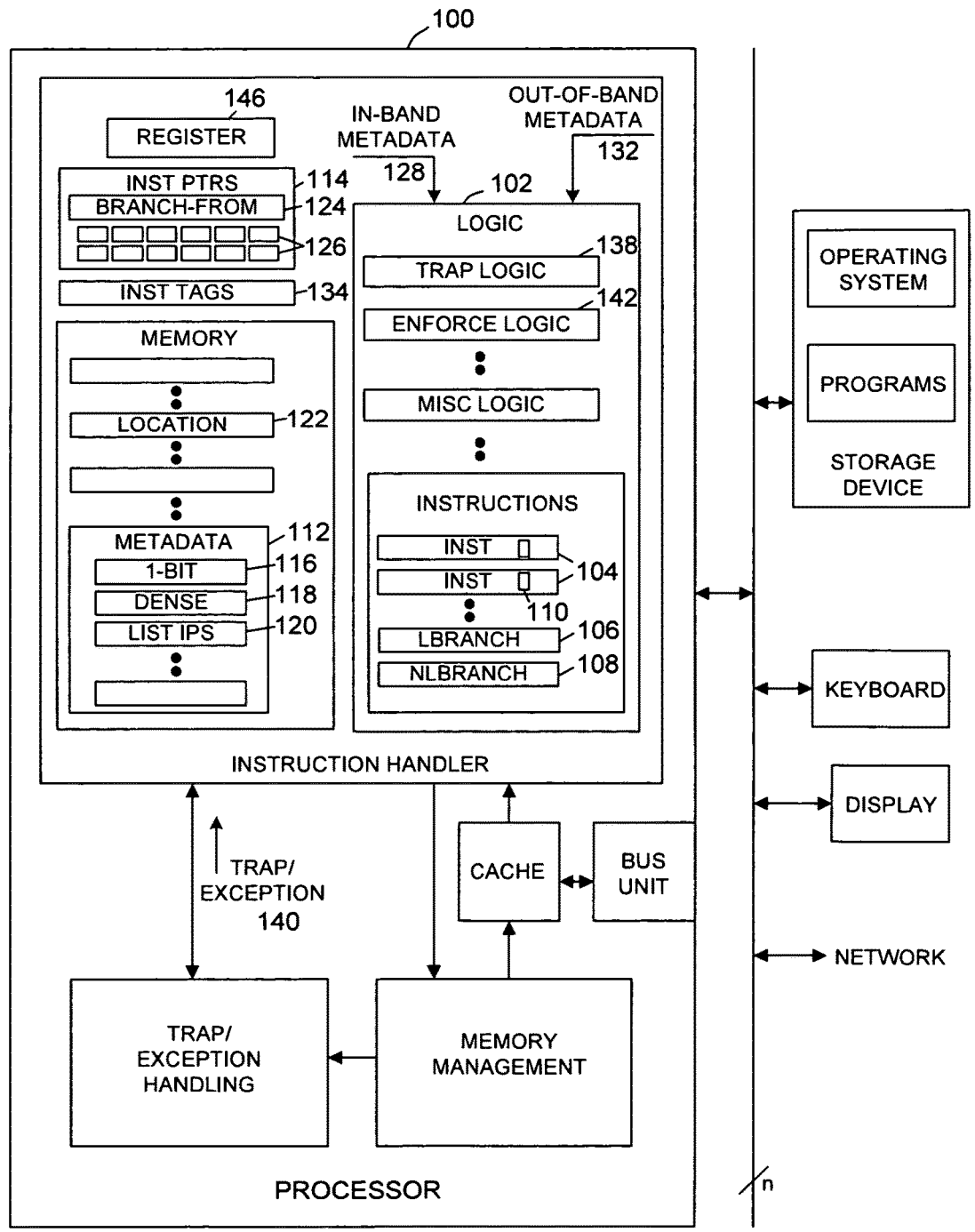
FIGS. 1A, 1B, and 1C are respectively a first schematic block diagram, a data structure diagram, and a second schematic block diagram depicting an embodiment of a processor that is operable to ensure that program code can only be used for a designed purpose and not exploited by malware.

In the present document, the term "code integrity" refers to techniques that seek to ensure that code is only used for its designed purpose, and is not exploited by malware.

For example, malware which controls the stack can use return-oriented programming, a technique used to execute code without injecting binary executable code. Code integrity techniques can be implemented to prevent some such ad-hoc and unjustified returns.

Malware can occasionally exploit instruction misalignment to synthesize instruction streams other than those planned by the user. Techniques can be used to prevent instruction misalignment. However, exploits such as return oriented programming are possible even on machines with strict instruction alignment and fixed length instructions.

Exploits can also take advantage of indirect branches in a manner similar to a return (returns are simply indirect branches to a caller IP on the stack), although returns are much more common than indirect branches. Indirect branches are more difficult to exploit since to do so requires, for instance, the ability to violate a stack location which will be loaded into a register used to make an indirect jump.

Attacks on code integrity can take other forms. Terms such as hijacking or code hijacking reflect how attacks on code integrity do not involve code injection, but rather take control of code that is already present.

Disclosed herein are several devices and techniques for preserving code integrity.

Most instructions in program code are not legitimate branch targets, at least not for ordinary control flow such as goto instructions or jumps, indirect jumps, calls, and returns. Although many, if not most or all instructions, may be legitimate targets for returns from interrupts or exceptions, but this special case is usually associated with returning from operating system code in an interrupt handler.

Techniques are disclosed herein for tagging legitimate branch targets. One basic technique for ensuring code integrity involves tagging legitimate branch targets; or, similarly, to distinguish legitimate branch targets from non-legitimate branch targets. Distinction between legitimate branch targets and non-legitimate targets can be made, for example: (a) via a bit in each instruction, and (b) by only allowing the instruction at the branch target to be a special instruction or class of instructions, which may be called a legitimate branch target instruction.

This sort of legitimate branch target instruction is similar to (but not quite) the infamous "come-from" instruction.

Because branch targets are relatively common, using the legitimate branch target instruction on an instruction set with 32-bit fixed-length instructions may be inefficient, but may be acceptable if the instruction set allows 8-bit no-operations (NOPs).

Note that using a NOP from an existing instruction set as a legitimate branch target instruction has the advantage of backward compatibility. For instance, new code annotated in this manner would run on old machines (x86 has a plethora of 8-bit instructions, such as XCHG EBX,EBX).

Distinction between legitimate branch targets and non-legitimate targets can further be made, for example: (c) by using non-adjacent metadata, for example, by creating a datastructure indexed by Instruction Pointer (IP) address, associating metadata with the IP.

Such legitimate branch target metadata can be only a single bit used to indicate that the instruction is permitted to be a branch target (possibly small dense metadata, in the form of a bit per IP). In other configurations, the legitimate branch target metadata can be a longer list, indicating the only IPs that are allowed to branch to the specified location. An example can be sparse or relatively sparse but large metadata, such as a list of branch-from IPs, or classes of IPs.

Any of the existing, well-known forms of memory metadata can be used for the instruction annotations of legitimate branch targets including in-band or out-of-band instruction tags. Additional techniques such as in-band can be enabled because of special circumstances of instruction set design.

In-band tags can include, for example, a bit in each instruction opcode on an instruction set originally designed to include the tags, or specific legitimate branch target instructions. Out-of-band instruction tags can include larger metadata such as a list of branch forms.

Techniques are also disclosed herein for enforcing legitimate branch targets. Enforcement of legitimate branch targets can be performed inline or offline and/or out-of-line.

Inline enforcement can be implemented. For example using a new instruction set can be defined in which a trap occurs if a branch is made to an instruction that is not a legitimate branch target.

Enforcement of legitimate branch targets can also be implemented via an enabling operating mode. For example, an existing instruction set can be modified by creating a mode for legitimate branch target enforcement. By default the mode can be disabled. When enabled, checking can be performed inline, for example by using tags.

An instruction set and associated system that implement a legitimate branch target enforcement mode employ some technique for enabling and disabling the mode. For example, the legitimate branch target enforcement mode can be controlled by appropriate instructions such as ENABLE_LEGITIMATE_BRANCH_TARGET_CHECKING and DISABLE_LEGITIMATE_BRANCH_TARGET_CHECKING. These instructions can be configured as generic instructions which set a bit in a control register. A desirable capability may be to enable checking inside particular functions near to the function call entry point, and to disable on return from the function. The location of checking by out-of-band metaband can be implicitly indicated, a functionality well-suited to out-of-line checking. Out-of-band metadata, for example object metadata, arrives with communicated data.

Offline and/or out-of-line enforcement can be implemented. For example, checking can be performed out-of-line by a thread separate from the executing thread.

In some embodiments, legitimate branch targets can be enforced through use of a log-based architecture (LBA), which can be formed by adding hardware support for logging the trace of a main program and supplying the trace to another currently-nonexecuting processor core for inspection. A program running on the second core, called a lifeguard program, executes the desired logging functionality. Log-based architecture lifeguards execute on a different core than the monitored program and increase efficiency since the concurrent programs do not compete for cycles, registers, and memory (cache). Logging by the lifeguards directly captures hardware state and enables capture of the dynamic history of the monitored program.

In an example embodiment, a lifeguard can drive the log record fetch, operating as a set of event handlers, each of which ends by issuing a specialized "next LBA record" instruction, causing dispatch hardware to retrieve the next record and execute the lifeguard handler associated with the specified type of event. Appropriate event values, such as memory addresses of loads and stores, and legitimate branch target tags, are placed in a register file for ready lifeguard handler access. Thus, a particular lifeguard can be used to implement legitimate branch target enforcement.

Any of the disclosed techniques for enforcing or checking legitimate branch target rules can be applied, to any of the forms of legitimate branch target, ranging from simple to more advanced forms. The simple forms disclosed hereinabove include a single-bit tag indicating the instruction either is or is not a legitimate branch target, and a list of legitimate branch-from addresses for a particular legitimate branch target.

Another example of a suitable type of branch target is "local branch only" wherein a target is allowed to be branched-to only by "local" code.

Identifying code as "local" enables x86 segmentation support of near/far memory wherein memory is divided into portions that may be addressed by a single index register without changing a 16-bit segment selector (near), and a real mode or x86 mode with a segment specified as always 64 kilobytes in size. "Local" may be considered to imply IP-relative branches with a limited offset, for example 16-bits.

Still another example of a suitable type of branch target is an "indirect branch target" in which the instruction is or is not allowed to be branched-to by an indirect branch. Typically, most instructions are not allowed to be branched-to. In an example embodiment, the indirect branch target may be accompanied by a list of indirect branch instructions that are allowed to branch to the target. One is often sufficient, although certain optimizations replicate the indirect branch of a CASE statement.

A further example of a suitable type of branch target is a return in which the instruction is or is not allowed to be returned-to.

Any of the techniques such as inline tag or instruction, out-of-line can be used. But the special case of CALL/RETurn permits some optimization. On a fixed length instruction set, the return IP can simply be decremented by the instruction width, combined with checking for the presence of a CALL instruction. The technique is operable even on variable length instruction sets if the CALL instruction is fixed length. On instruction sets with more pronounced length variability, the calling convention can be redefined to record the IP of the CALL instruction, not the instruction after the CALL. A RETurn instruction can be used to ensure that a CALL instruction is at the correct place, before incrementing the IP to resume execution at the instruction after the CALL.

One disadvantage of CALL and RETurn legitimate branch target arrangements is that techniques to prevent return address stack destruction such as stack shadowing are inapplicable.

A list of places where a RETurn is allowed from can be supported. Also generic indications such as "local" versus "remote" returns can be supported.

Another example of a suitable type of branch target can be a "No-eXecute (NX) bit branch-from" instruction. The NX bit can be used by processors to segregate areas of memory for use by either storage of processor instructions or code for storage of data.

The current instruction can be a legitimate branch target of code that is (or is not) marked as read-only executable code. For example, a default condition can be imposed that branches are only allowed from read-only code. Only instructions that are expected to be branched-to from writable code pages can be marked, for example instructions that are permitted targets for code generation such as self modifying code (SMC).

In an example embodiment, traditional operation of the NX bit can be modified to attain functionality of "from pages marked with the NX bit when NX bit checking is disabled." In other embodiments, the same functionality can be attained by introducing a new mode.

Still another example of a suitable type of branch target can be a "CALL target" instruction wherein the current instruction is (or is not) allowed to be the target of a CALL.

Any of the disclosed techniques, for example tag bit, special instruction, out-of-band, and the like, can be used with the CALL target, although again, the characteristic of the CALL target as being close to a function call, may impose usage of "standard" special instructions like the x86's ENTER instruction, rather than a new ENTRY_POINT instruction.

One aspect of instruction set design is instruction set length and alignment. Considerations taken into account in determining instruction length include whether the instruction set should have fixed length instructions or variable length instructions, and how long the instructions should be.

For example, GNU Compiler Collection (GCC) is a compiler system supporting various programming languages. A group developing a GCC Compiler for an IBM Research Supercomputer selected fixed-length 40-bit instructions on the basis that 32-bit instructions were insufficient for selecting from among 256 registers. Usage of fixed-length instructions enables hardware with simpler decoding circuitry. The program counter (PC) is specified to count instructions rather than bytes and the instructions are a single byte long.

Mid-Instruction Branching

Another aspect of instruction set design is to determine whether to allow branching into the middle of an instruction, a determination that may be considered an instruction alignment issue, related to the data alignment issue for date memory references.

Strict Instruction Alignment

In a system with strict instruction alignment, instruction sets can impose fixed-length instructions with a length N, requiring all instructions to be on addresses A such that A mod N=0 (on multiples of N).

Strict instruction alignment can be considered to extend to instructions with variable length instructions where all the larger instructions are multiples of all of the smaller instructions, for example an instruction set with 16-bit, 32-bit, and 64-bit instructions. In a specific example, a 16-bit instruction can begin on any even 8-bit boundary, but a 32-bit instruction must begin on a 32-bit boundary, implying that one 16-bit instruction must always be associated with a second 16-bit instruction or a 16-bit NOP to enable a 32-bit instruction to begin. A similar condition applies for 64-bit instructions.

A similar allowable strict instruction alignment instruction set can include 16-bit, 32-bit, and 96-bit instructions, but not have 64-bit instructions.

An example of a strict instruction alignment configuration is the Gould NP1 superminicomputer that imposed strict instruction alignment of 16-bit and 32-bit instructions, that can allow a pair of 16-bit instructions within a 32-bit block to be executed in a superscalar manner.

Most existing instruction sets of mixed 16-bit and 32-bit instructions do not appear to require 32-bit instructions to begin on a 32-bit boundary, except for instruction sets that have 16-bit and 32-bit instruction modes rather than full interleaving of the different instruction sizes.

Strict instruction alignment is essentially a natural alignment, although the term natural alignment is more usually associated with power of two sizes of data, such as 8-bit on any byte boundary, 16-bit on any even byte boundary, 32-bit on any boundary that is a multiple of four, and the like.

Overlapping Variable Length Instructions

A system can be configured with overlapping variable length instructions. For instruction sets with variable length instructions, or even for fixed-length instructions but where strict instruction alignment is not required, branching into the middle of a valid instruction may be possible, and to find in the middle of a valid instruction a new, different, valid instruction. Thus, any particular contiguous block of instruction bytes may correspond to several possible sets of instructions, depending on where the block is entered. (Note the observation that such instruction sequences often resynchronize after a short time, which has be attributed by Jacob et al. to the Kruskal Count. Refer to Matthias Jacob, Mariusz H. Jakubowski, and Ramarathnam Venkatesan. 2007. Towards integral binary execution: implementing oblivious hashing using overlapped instruction encodings. In Proceedings of the 9th workshop on Multimedia \& security (MM\&\#38; Sec '07). ACM, New York, N.Y., USA, 129-140).

For example, the Intel x86 code sequence:
B8 01 C1 E1 02 90 41,
corresponds to the instruction:
move ax, C1E10290;
but also contains the sequence:
C1 E1 02 90 41,
which corresponds to the instruction:
shl eax, 2; nop,
if started not at the first but at the third byte.

Overlapping instructions have historically caused problems for disassemblers and decompilers, and have been used as ways of obfuscating code, for example hiding malware or copy protection code. Overlapping instructions have been used to break into code, for example by branching around checking sequences, or in creating little snippets of code to be executing by stack smashing returns.

Overlapping Non-Strict Fixed Length Instructions

A system can be configured with overlapping non-strict fixed-length instructions. Most instruction set architectures with fixed-length instructions also have strict instruction alignment.

The system disclosed herein suggests extension to instruction sets with a non-strict alignment, for example an instruction set comprising 5-byte, 40-bit instructions.

The program counter (PC) can be operable to contain instruction byte addresses, and strict enforcement is not enforced by requiring that an instruction address be equal to zero mod 5.

The problem can be avoided, for example by having the program counter (PC) contain instructions rather than instruction byte addresses, obtaining the byte addresses by multiplying by 5 (x<<2+x).

However, the problem is not solved since virtual address aliasing may also result in out of synchrony instruction boundaries. Approaches such as requiring strict instruction alignment to a non-power-of-2 may greatly reduce, but cannot eliminate, the frequency of the instruction misalignment in the presence of possible operating system virtual memory misbehavior. For instance, instruction misalignment may be ignored for performance reasons, but not correctness and security.

The problem of instruction misalignment, specifically branching into the middle of an instruction, can be addressed or ignored. Addressing instruction misalignment is desirable because binary translation tools such as Intel Pin are more easily written in the absence of instruction misalignment and such tools can be very useful in performance optimization. A further advantage of preventing instruction misalignment is that strict instruction alignment plus other constraints sometimes facilitates operation of decoded instruction caches. A reason to allow instruction misalignment is that the binary translation tools facilitate movement of binary code to other computing systems, including systems with other instruction set architectures, at the corresponding cost of reduced security.

One condition for facilitating the building of a decoded instruction cache is an instruction set with fixed length instructions and strict alignment of power of two-sized instructions: 16-bits, 32-bits, 64-bits, and so on. This condition may be insufficient in practice. A further condition is that decoding be 1:1 so that a fixed number of instruction bytes or words always produce a fixed number of instructions. The second condition is not always met. Some so-called RISC (Reduced Instruction Set Computer) instructions may naturally be desirably decoded into multiple internal instructions.

A non-1:1 mapping of instruction addresses to decoded instructions substantially increases the difficulty of configuring decoded instruction caches for several reasons including the presence of variable length instructions, instructions with a variable number of decoded microinstructions, and optimizations that remove instructions. Removing a few instructions per line may be easy to handle simply by padding but significant optimizations are more difficult to achieve.

In particular, basic block caches and trace caches present challenges because even if a 1:1 mapping of instructions to micro-operations (uops) exists, the number of instructions and/or uops in a basic block or trace may be variable. Or, if the number of instructions of uops is fixed in such a basic block cache, the number corresponds to a variable, and possibly discontiguous, range of instruction bytes. Instruction address range variability for cache blocks complicates instruction cache snooping.

Instruction misalignment poses different issues for machines with and without a coherent instruction cache. On a machine with an incoherent instruction cache, not only may the instructions being executed be inconsistent with memory, but incoherent copies may be present in the local instruction cache, possibly resulting in even more inconsistent performance than for ordinary lack of coherence. However, similar performance problems can occur with a trace cache, even with fixed-length instructions.

Accordingly, whether instruction misalignment should be addressed has advantages and disadvantages. In practice, microarchitectures that can handle instruction misalignment have been built and have been successful.

One reason to address instruction misalignment is code integrity. Instruction misalignment has often been used by malware. Preventing instruction misalignment can improve security.

Various techniques are disclosed herein for eliminating instruction misalignment. Results attained by applying these techniques can be compared in terms of cost in actual expense and performance.

Instruction encoding can be defined to prevent instruction misalignment.

Instruction Encodings for Preventing Misalignment

One technique for instruction encoding to prevent instruction misalignment is an in-line tag bit per minimum instruction chunk to indicate the start of an instruction.

In an illustrative example, for an encoding of a 16-bit instruction which appears as:
1xxx_xxxx_xxxx_xxxx.
The encoding of a 32-bit instruction can be:
1yyy_yyyy_yyyy_yyyy 0yyy_yyyy_yyyy_yyyy.
The encoding of a 64-bit instruction can be:
1zzz_zzzz_zzzz_zzzz 0zzz_zzzz_zzzz_zzzz
0zzz_zzzz_zzzz_zzzz 0zzz_zzzz_zzzz_zzzz.

In the illustrative example, in general all instructions are multiples of the minimum instruction chunk size, in the above sample, 16-bits.

Each instruction chunk has a bit that indicates whether the bit is the start of an instruction, in more generality, a multi-bit field or possibly even the entire chunk.

The fields of xs, ys, and zs may disambiguate and thus fully decode to indicate the proper length. Another possibility is that the fields xs, ys, and zs may not disambiguate completely so that one instruction chunk past the end of the current instruction may have to be examined for decoding to find another instruction chunk that is marked as the beginning of an instruction. For the second possibility, requiring a padding instruction indicating the end of the previous instruction may be desired for placement at the end of a code segment, separating code and data.

Usage of instruction encodings to prevent instruction misalignment is advantageous because the techniques are simple.

A disadvantage with usage of instruction encodings to prevent instruction misalignment is that discontiguous instruction fields can result. For example, a 16-bit constant literal inside the instruction would be split into 15-bits and than a single bit.

This disadvantage can be handled by in-instruction size encoding.

For an illustrative example of in-instruction size encoding. An encoding of a 16-bit instruction can appears as:
1xxx_xxxx_xxxx_xxxx.
The encoding of a 32-bit instruction can be:
1yyy_yyyy_yyyy_yyyy 0yyy_yyyy_yyyy_yyyy
The encoding of a 96-bit instruction can be:
1zzz_zzzz_zzzz_zzzz 0zzz_zzzz_zzzz_zzzz
0zzz_zzzz_zzzz_zzzz 0zzz_zzzz_zzzz_zzzz.

Instruction alignment bits can be collected at the start of the instruction. Let the encoding of a 16-bit instruction appear as:
1xxx_xxxx_xxxx_xxxx.

The encoding of a 32-bit instruction can be:
01yy_yyyy_yyyy_yyyy yyyy_yyyy_yyyy_yyyy.
The encoding of a 64-bit instruction can be:
001z_zzzz_zzzz_zzzz zzzz_zzzz_zzzz_zzzz
zzzz_zzzz_zzzz_zzzz zzzz_zzzz_zzzz_zzzz.

The illustrative encoding use an encoding trick of finding the first set bit to indicate size, permitting extensibility, for example, to 128-bit instructions. The depicted encoding is optional and can be replaced with a more-packed, less-extensible encoding. For example, the encoding of a 16-bit instruction can appear as:
1xxx_xxxx_xxxx_xxxx.
The encoding of a 32-bit instruction can be:
00yy_yyyy_yyyy_yyyy yyyy_yyyy_yyyy_yyyy.
The encoding of a 64-bit instruction can be:
01 zz_zzzz_zzzz_zzzz zzzz_zzzz_zzzz_zzzz
zzzz_zzzz_zzzz_zzzz zzzz_zzzz_zzzz_zzzz.

The illustrative encoding has less extensibility. Another example can use a three-bit field for the 32-bit and 64-bit instructions.

However, because the bits that indicate instruction alignment are at the front of an instruction, for branching into an instruction at an address that is something like 2 modulo 4, whether the position corresponds to a 16-bit instruction or the middle of a 32-bit or 64-bit instruction is unclear. To resolve the condition may require looking back in the instruction stream.

A technique for looking back in a strictly-aligned instruction stream may be used.

In a strictly aligned instruction stream, 32-bit instructions are positioned on a 32-bit boundary, and 64-bit instructions are positioned on a 64-bit boundary, and so on. The positioning is most easily attained if instructions are powers of two in size such as 16-bit, 32-bit, 64-bit, or at least are all multiples of all smaller instructions.

Instruction boundaries for each of the instruction sizes can be observed, up to the largest naturally-aligned instruction size. For example, if positioned at a 16-bit boundary, look to the earlier 32-bit and 64-bit boundaries. If positioned at a 32-bit instruction, look to the earlier 64-bit boundary. If positioned at a 64-bit instruction, look no further, since no larger instruction size exists in the example.

For positioning at a 16-bit instruction boundary, and if the 32-bit and 64-bit boundaries observed by looking-back do not indicate existence of a larger overlapping instruction, then the looking-back operation is complete.

A generalized example of the looking-back technique can be described in pseudocode as follows:
Given an instruction pointer IP
If the bitstream at this position decodes to an illegal instruction, stop
If the bitsream at this location decodes to a legal instruction whose size satisfies the alignment, continue
else stop
For all larger instruction sizes Sz
look at the earlier Sz-yh boundary ("round down" to a Sz-th boundary)
If the bitsream at this location decodes to a legal instruction whose size satisfies the alignment of the boundary and whose size would overlap the current instruction
Then flag an error for the current instruction.
end loop
if arrived here then no instruction alignment error was detected The illustrative approach does not require explicit fields for instruction size in the instruction, although such fields are convenient.

The technique is suitable so long as the encodings disambiguate, such that:

xxxx_xxxx_xxxx_xxxx, yyyy_yyyy_yyyy_yyyy yyyy_yyyy_yyyy_yyyy, and zzzz_zzzz_zzzz_zzzz zzzz_zzzz_zzzz_zzzz
zzzz_zzzz_zzzz_zzzz zzzz_zzzz_zzzz_zzzz.

The encodings disambiguate so long as some bit differences exist between the first 16-bits of the xs and ys and zs, and some bit differences exist between the first 32-bits of the ys and zs, and the like. The encodings disambiguate so long as bit differences exist between any two instructions, within the length of the smallest instruction.

The size fields, such as 1/01/001 or 1/00/01 indicate that fewer bits are observed. The entire instruction need not be decoded.

A technique can be used for looking back in a non-strictly aligned instruction system. For example, assume a mix of 16-bit and 32-bit instructions that are not strictly aligned. A 32-bit instruction can begin on any 16-bit boundary, although 16-bit instructions must begin on 16-bit boundaries.

Encoding of a 16-bit instruction can appear as:
1xxx_xxxx_xxxx_xxxx.

Encoding of a 32-bit instruction can be:
01yy_yyyy_yyyy_yyyy yyyy_yyyy_yyyy_yyyy.

A technique for detecting branching into the middle of the 32-bit instruction depicts actions taken for a branch to an arbitrary location, looking back.

First, determine whether the position is at a legitimate instruction boundary. For an example instruction:
iiii_iiii_iiii_iiii.

The instruction may look like a legitimate instruction, but may turn out to be bits from the middle of a larger, overlapping instruction.

In a simple case, if the instruction looks illegal, stop.
Looking back—16-bits may be seen as:
1hhh_hhhh_hhhh_hhhh,
which is possibly a 16-bit non-overlapping instruction.
Looking at instruction:
iiii_iiii_iiii_iiii.

The instruction at −16-bit could be a 16-bit instruction indicating a legitimate instruction boundary. Or the instruction could be part of a 32 bit instruction. In the latter case, since no instruction sizes are larger than 32b, then the instruction boundary is legitimate. Thus, if the instruction at −16-bit is a small instruction that does not overlap, the instruction boundary is legitimate.

Looking back −16-bits may be seen as:
01 hh_hhhh_hhhh_hhhh,
which is possibly a 32-bit overlapping instruction.
Looking at instruction:
iiii_iiii_iiii_iiii.

The instruction at −16-bit could be a 32-bit instruction indicating positioning at an instruction boundary that is not legitimate. Or the instruction could be part of a 32 bit instruction. In the latter case, since no instruction sizes are larger than 32-bit, then the instruction boundary is legitimate.

Looking back −16-bits may be seen as:
1ggg_gggg_gggg_gggg
01hh_hhhh_hhhh_hhhh.
Looking at instruction:
iiii_iiii_iiii_iiii.

If all instruction chunk boundaries look like a possible sequence of possibly overlapping instructions, then no basis to "synchronize" is available. Determining whether the instruction boundary is legitimate is not possible. The problem is lack of ability to determine how far back to look.

Various special techniques can be used to determine legitimacy of instruction boundaries, for example by requiring the compiler to insert a synchronization instruction every N instructions. But in general looking back an arbitrary amount is undesirable. One special technique may be to always ifetch (instruction fetch) the naturally-aligned 128 bits surrounding a 16-bit chunk. But looking backwards across pages or other boundaries is undesirable.

Still another technique for encoding instructions to prevent instruction misalignment is the usage of in-line multiple-instruction templates.

Techniques disclosed hereinabove indicate the operation of in-line tag bits at fine granularity. Other of the disclosed techniques teach how the additional information of strict instruction alignment enables instruction misalignment to be detected, both with and without fields that specify instruction size. But in-line instruction granularity tag bits don't work if an infinite sequence of possibly overlapping instructions precedes the observation position.

To avoid the undesirable action of looking back an arbitrary amount, instruction fetch can be divided into fixed size blocks, for example 128 bits. All instruction fetch can be configured to fetch this large a block, even though branching to an instruction inside the block, and not at the beginning of the block, is possible. Or, at least, the location inside the block being branched-to is fetched, plus a few more bits possibly elsewhere in the block.

The block can be operable as a template, with a few bits at a well known place in the large block (for example 128 bits), indicating instruction boundaries.

An example can be used to explain operation of the in-line multiple-instruction templates. The example template is specified in the form of 128-bit blocks. Instructions that are a multiple of 16-bits, such as 16-bits and 32-bits, are allowable although the example can also handle 48-bit, 64-bit, 96-bit, 128-bit, and the like instructions. The 0th 16-bit chunk of the block can be reserved for block template bits. Other aligned 16-bit chunks of the block can contain instruction data. Eight 16-bit chunks can be in the block—actually seven, since the least significant chunk is occupied by the template. A bitmask can be specified as follows: bits 1 to 7, indicating an instruction boundary. For example, bit i being set can mean branching to chunk I is permitted, or to start decoding at chunk i. The illustrative configuration is more than sufficient to accomplish the purpose of detecting misalignment since only 7 bits of the 16 available by reserving the entire 0th chunk are used.

Other examples can specify more information in the template. For example, a bit can be used to specify whether "falling through" from a previous instruction block into the current block is permitted. If assumed that such "falling through" is not permitted—if assumed that the first 16-bit chunk in a block is always a new instruction—then only six bits are needed in the mask, rather than seven.

The large number of free bits enables use for other purposes such as code integrity, to indicate legitimate branch targets as well as legitimate instruction boundaries.

For example, a simple encoding can be supported. In chunks 2-6, two bits per chunk can be used for encoding including one bit to indicate a legitimate instruction boundary, and +1 bit to indicate a legitimate branch target. This specification indicates some redundancy since the instruction cannot be a branch target if not an instruction boundary. Another possible tighter encoding example can be: 00 for no instruction boundary, 01 for instruction boundary but not a branch target, 11 for an instruction boundary and branch target, and 10 undefined or reserved for other uses.

In chunk 1, four states can be represented including: 00 for not an instruction boundary which may be part of the instruction in the previous block, 01 for an instruction boundary and not a branch target with fall-through from the previous block allowed, 10 for an instruction boundary and branch target with no fall-through from the previous block allowed, and 11 for an instruction boundary and branch target with fall-through from the previous block allowed.

In chunk 7, the two bits for chunks 2-6 are supplemented by an additional bit to indicate that chunk 7 is the end of an instruction.

In the example, 15 of the 16 available bits are used. Other examples can consolidate the bits more, such as to 13 bits, if found to be useful.

One useful example application that fits in a single block is an i-block (instruction block) legitimate CALL target, with the not unreasonable requirement that functions begin on a i-block boundary. Since CALLs are seldom spoofed, an indirect jump target, with the same alignment requirement, an indirect jump or call, and an indirect call can be implemented using in-line multiple-instruction templates. But a RETurn target, can probably not be implemented since requiring function CALLs have a minimum alignment is likely to be onerous, although the CALL might be allowed to be at a non-i-block alignment, but just requiring the RETurn to be aligned to the next i-block boundary.

In the example application, seven 16-bit instruction chunks can be included in a 128-bit instruction block with one chunk per block reserved for a template that describes where instructions begin and end, as well as possible branch targets.

The example application can be generalized, even to non-power-of-two sized instructions. For example, 128-bit instruction blocks can contain either five 24-bit instructions or three 40-bit instructions. One byte per i-block is thus left to use as a template. One-bit or two-bit encodings can be used to distinguish 24-bit from 40-bit instruction sizes. One bit per chunk can be used to indicate a branch target with another bit allocated for fall-through.

A general form can be described as: (a) an instruction stream with instructions that are all a multiple of a given i-chunk size, (b) an i-block with a size equal to several such i-chunks plus extra bits to be used as a template, and (c) the template of the i-chunk describing one, some or all of several characteristics. The template can describe which i-chunks within the i-block are legitimate instruction beginning points, in particular whether the first i-chunk is part of an instruction from the previous i-block in the static code layout, and possibly also whether the last i-chunk terminates or overflows into the next i-chunk. The template can further describe which i-chunks are legitimate instruction branch targets, in particular whether the first chunk can fall through with non-branch execution from the previous i-chunk.

An even more general form can be described as: (a) an instruction stream with instructions of predetermined sizes, but not necessarily multiples of an i-chunk size larger than a single bit, (b) an i-block with a size sufficiently large to contain several such instructions plus extra bits to be used as a template, and (c) the template indicating the sizes and/or boundaries of instructions within the i-block.

The concept of a template reflects some aspects of VLIW instruction sets and is extended for use for sequential, non-VLIW, instruction encoding. In the illustrative example, templates can be used for instruction encoding of sequential instructions without the explicitly parallel bits used to control VLIW.

The template approach adds several aspects to the instruction set including: (a) branching is made to i-block number or the instruction number in the i-block, rather than an address, and (b) for branching to an address, the chunk that holds the template is jumped-over.

One approach allows any multiple of 16-bit instructions to be used, rather than restriction to an i-block of all the same instruction size.

Out-of-Line Metadata

Out-of-line metadata can be used to detect legitimate instruction boundaries and legitimate branch targets. As in the case of code integrity, checking can be performed in-line or out-of-line, orthogonal to the issue of how legitimate instruction boundaries are indicated.

Page code integrity techniques can be used to check only legitimate branch targets rather than all legitimate instruction boundaries.

Usage of out-of-line metadata to detect legitimate instruction boundaries and legitimate branch targets of different types can be done in support of code integrity, and also possibly other applications such as decoded instruction caches and binary translation.

Unmarked Legacy Instructions

Unmarked legacy instructions plus unmarked new instructions can be used to support code integrity.

Hereinbefore are discussed legitimate instruction boundaries and legitimate branch targets of different types in support of code integrity for new instruction sets, designed from the outset to support objectives. However, code integrity is also sought for extending existing instruction sets since long-used, well-developed instruction set architectures are unlikely to be scrapped in deference to new entries.

Considering an example of an existing 32-bit RISC instruction set architecture, the instruction size may be set at 32-bits and strict instruction alignment imposed. An improved instruction set may be sought, for example to introduce support for both smaller (for example, 16-bit) and larger (such as 64-bit or 128-bit) instructions. The improved instruction set can be further extended to include the various types of code integrity techniques disclosed herein.

The improved instruction set may support a variable length instruction mode or may be modeless.

In the case of a new configuration that supports variable length instruction mode and if the existing-set 32-bit instructions cannot be distinguished from the instructions of different length without knowing the mode (decoding requires the mode to be known), out-of-line metadata can be used to indicate the mode to be associated with a group of instructions. Any suitable metadata technique can be used. A particularly useful metadata technique can have the outlying metadata in page tables. For example, a page table encoding can be included indicating that the page contains existing instruction set instructions rather than new instructions.

The new instruction sizes can be indicated in the page table or, since the page table bits are usually scarce, can be enabled using other techniques, as disclosed hereinbefore, possibly in addition to other properties such as legitimate instruction boundaries of the new instructions. Suitable techniques can include non-page table outlying metadata, or any of the instruction encoding techniques described hereinbefore.

In a modeless configuration, instructions of different lengths are to be distinguished simply by accessing common bits. Then, the strict instruction alignment techniques disclosed hereinbefore can be used to check for gradually larger possible overlying instruction boundaries to determine whether a larger overlaying instruction is present. The illustrative procedure has advantages and disadvantages (including possible fragmentation to pad small instructions to a next larger size).

The illustrative example enables a 32-bit RISC instruction set to be extended down to 16-bit instructions and up to 64-bit or 128=bit instructions with full support for preventing instruction misalignment. The technique works best with nesting instructions and strict instruction alignment, such as power of two sizes. Handling of odd-sized instructions, such as 24-bit and 40-bit instructions, is more difficult.

Strawman Control Flow Integrity Instruction Set

Embodiments of systems and methods can use strawman techniques to enable code integrity and control flow integrity, in addition to instruction length and alignment.

Strawman techniques can be used to enforce legitimate instruction boundaries. Definition of a new instruction set can use any of the techniques for preventing instruction misalignment or overlapping instructions described hereinabove. These techniques indicate legitimate instruction boundaries on all or most instructions, and prevent branching into the middle of an instruction. Because the techniques affect so many instructions, overhead can be minimized by having only one or a few bits per instruction.

Examples of suitable techniques can include a bit per 16-bit ifetch chunk indicating location of legitimate instruction boundaries, templates in a larger ifetch chunk indicating legitimate instruction boundary location, strict instruction alignment, and others.

The strict instruction alignment technique is operable, for example, for an instruction set with nestable 16/32/64 bit instructions that can be distinguished by decoding. The strict instruction alignment technique is highly suitable for usage with legacy instruction sets.

A control register can be used to enable checking for legitimate instruction boundaries. Other suitable techniques can be used for enablement.

Strawman techniques can also be used for control flow target checking. Various changes of control flow include direct branches, indirect branches, direct or indirect calls, returns, exceptions, special case control flow changes, and the like. The changes in control flow may be subject to fairly narrow imposed restrictions.

Embodiments of the disclosed systems and methods use a highly suitable technique for control flow target checking, a CONTROL_FLOW_ASSERTION instruction.

The CONTROL_FLOW_ASSERTION instruction may have several versions, mainly to distinguish versions that have operands (such as the address that may have branched to the current instruction, or even an address range) from those that do not have such operands.

One example CONTROL_FLOW_ASSERTION instruction can have the form "CONTROL_FLOW_ASSERT bitmask," including the instruction and a bitmask. The instruction has an Immediate constant bitmask that defines checks to be made. Several checks can be made in one instruction. Bits for the multiple checks are logically-ORed. If none of the conditions match, a trap or exception is thrown.

An example of a strawman set of bitmask bits can include: (a) a bit indicating that the instruction may or may not be reached by "falling through" from sequential execution from the previous instruction.

Some of the bitmask bits can use relative branches as a convenient form for defining "locality" so that: (b) the instruction may be the target of an unconditional direct branch (a relative code transfer), or (c) the instruction may be the target of a conditional direct branch (a relative code transfer).

Some of the bitmask bits can be used to support non-relative branches which tend to be "external" or non-local. Accordingly, a bitmask bit can indicate: (d) the instruction may be the target of a non-relative direct branch.

One or more of the bitmask bits can be used to support indirect branches which tend to be local and can be used in stylized manners. Accordingly, a bitmask bit can indicate: (e) the instruction may be the target of an indirect branch.

Bitmask bits can also be used in the case of function entry points so that: (f) the instruction may be the target of a relative function call, (g) the instruction may be the target of a non-relative or absolute function call, or (h) the instruction may be the target of an indirect function call.

In some embodiments, the bitmask bits can be used to distinguish branches used for tail recursion.

Bitmask bits can further be used in the case of return points so that: (i) the instruction may be the target of a function return instruction.

A CONTROL_FLOW_ASSERT bitmask that includes the functionality of all points (a) to (i) would have nine bits which may be reasonable, although reduction to eight bits may be desirable.

Another example CONTROL_FLOW_ASSERTION instruction can have the form "CONTROL_FLOW_ASSERT bitmask bitmaskNW," including the instruction and two bitmasks. The instruction has a first Immediate constant bitmask that defines checks to be made, for example with the same functionality as disclosed hereinabove for the instruction with a single bitmask. The instruction also can have a second bitmask with almost exactly the same bits describing exactly the same checks, but with an additional test that the instruction branching here must be from a page marked non-writeable (NW).

A further example CONTROL_FLOW_ASSERTION instruction can have the form "CONTROL_FLOW_ASSERT bitmask bitmaskXO," including the instruction and two bitmasks. In addition to the first immediate constant bitmask which defines the checks in the manner of the two instructions discussed hereinbefore, the instruction includes a second bitmask with almost exactly the same bits describing exactly the same checks, but includes an additional test that the instruction branching here must be from a page marked as execute only—not just non-writeable, but also not-readable. In this manner, control flow from pages that an intruder may be able to affect can be restricted.

Still another example CONTROL_FLOW_ASSERTION instruction can have the form "CONTROL_FLOW_ASSERT bitmask bitmaskF fromIP," which includes the instruction and two bitmasks. In addition to the first immediate constant bitmask which defines the checks in the manner of the two instructions discussed hereinbefore, the instruction includes a second bitmask with almost exactly the same bits describing exactly the same checks, but includes an additional test that the "From Instruction Pointer" (fromIP) of the instruction branching to the CONTROL_FLOW_ASSERTION instruction location matches. The instruction enables restriction of certain types of control flow to only a single fromIP, but generically allow other fromIPs. The CONTROL_FLOW_ASSERTION instruction may be the target of the indirect branch at fromIP.

The usefulness of restricting CALL targets to only a single fromIP (or return) appears to be limited. In fact, indirect branch is the only instruction likely to admit such a single fromIP restriction. Therefore, the bitmaskF may not be necessary, but instead simply encoding may be suitable. Accordingly, a CONTROL_FLOW_ASSERTION instruction can have the form "CONTROL_FLOW_ASSERT_INDIRECT_TARGET fromIP," in which the instruction may be the target of the indirect branch at fromIP. If the instruction is not the target, a trap can be generated.

Another example CONTROL_FLOW_ASSERTION instruction can have the form "CONTROL_FLOW_ASSERT bitmask bitmaskL," which includes the instruction and two bitmasks. In addition to the first immediate constant bitmask which defines the checks in the manner of the two instructions discussed hereinbefore, the instruction includes a second bitmask with almost exactly the same bits describing exactly the same checks, but includes an additional test that the instruction branching to the target CONTROL_FLOW_ASSERTION instruction must be "local".

The definition of local is problematic. Some example instructions are proposed that address possibly useful definitions of "locality". For example, a CONTROL_FLOW_ASSERTION instruction of the form "CONTROL_FLOW_ASSERT bitmask bitmaskL Zbit," in addition to the disclosed bitmask defining checks, the instruction has a second bitmask with almost exactly the same bits describing exactly the same checks, but includes an additional test that the instruction branching be "local" with locality defined to be that only the least significant bits of the from and to (current) address may differ. Zbit is the number of the most significant bit that may differ, and can be, for example, a 6-bit constant in the instruction for a 64-bit machine. Thus, for example, locality can be defined in the manner of "only allow jumps from within the same 16K region."

Another example of a CONTROL_FLOW_ASSERTION instruction which allows only local branching can have the form "CONTROL_FLOW_ASSERT bitmask bitmaskL lo, hi." In addition to the disclosed bitmask defining checks, the instruction has a second bitmask with almost exactly the same bits describing exactly the same checks, but includes an additional test that the instruction branching be "local" with locality defined to be in the interval (lo, hi). Accordingly, the fromIP must be within the specified range. The "lo, hi" designation may be absolute, or may be relative addresses. The interval may be relatively difficult to encode as compared to other techniques for defining locality.

A further example of a CONTROL_FLOW_ASSERTION instruction which allows only local branching can have the form "CONTROL_FLOW_ASSERT bitmask bitmaskL rel." In addition to the disclosed bitmask defining checks, the instruction has a second bitmask with almost exactly the same bits describing exactly the same checks, but includes an additional test that the instruction branching be "local" with locality defined to be in the interval (ip−rel, ip+rel). Accordingly, the fromIP must be within the specified range. The "rel" designation is similar to the "lo, hi" designation, except the encoding is simplified to only one limit. The encoding may be a value or may be the log 2 of the limit.

An additional example of a CONTROL_FLOW_ASSERTION instruction which allows only local branching can have the form "CONTROL_FLOW_ASSERT bitmask bitmaskL lo0, hi0, lo1, hi1." In addition to the disclosed bitmask defining checks, the instruction has a second bitmask with almost exactly the same bits describing exactly the same checks, but includes an additional test that the instruction branching be "local" with locality defined to be the union of the possible disjoint intervals [lo0, hi0] and [lo1, hi1]. Accordingly, the fromIP must be within the specified range. This form allows functions to be optimized into cold and hot regions, at the cost of encoding challenges.

The instruction definitions disclosed hereinabove have several varieties, typically described as instructions with a base bitmask, an additional bitmask, and tests. Any combination can be supported, generally subject to encoding limitations. For example, if deemed to be sufficiently important, all varieties could be supported on a variable length instruction set, or an instruction set with very long fixed length instructions. On a small instruction set, the varieties may be abbreviated, as found appropriate.

A combination instruction can have the form:
CONTROL_FLOW_ASSERT [bitmask][bitmaskNW] [bitmaskXO][bitmaskF fromIP][bitmaskL . . . ].

A control register can be used for holding enable bits for each of the checks.

A generic CONTROL_FLOW_ASSERT instruction can be defined.

The control flow integrity checks are operations that look at the instruction that branched to the current instruction. The information is of the type that is contained, for example, in the Intel x86 processor's Last Branch Records, which were added to the Intel P6 (sixth generation x86 microprocessor microarchitecture) RTL.

The CONTROL_FLOW_ASSERT instructions are shorthand for operations involving the "last Branch Information".

More general operations, such as "Instruction A can be reached from B and C but not D' are too idiosyncratic to put in hardware, but can be expressed by general purpose code, if the last branch records are easily accessible.

Unfortunately, the last branch records are not easily accessible in current machines, but rather require a system call to access, since the records are located in privileged machine state registers (MSRs). Therefore, an additional enhancement is proposed, to make the last branch records more easily accessible to ordinary user code intended to perform control flow integrity checks beyond those directly supported.

One example enhancement is to place the LBRs (Last Branch Records) in registers that can be read by user instructions, such as UNPRIVILEGED_READ_STATUS_REGISTER.

Another example enhancement is to create an instruction MOVE_LBR_TO_GPR, an approach similar to the instructions RDTSC (return time stamp counter) and RDPMC (read performance-monitoring counter) which also create special purpose instructions to read otherwise privileged registers from use code.

Figure 1B:
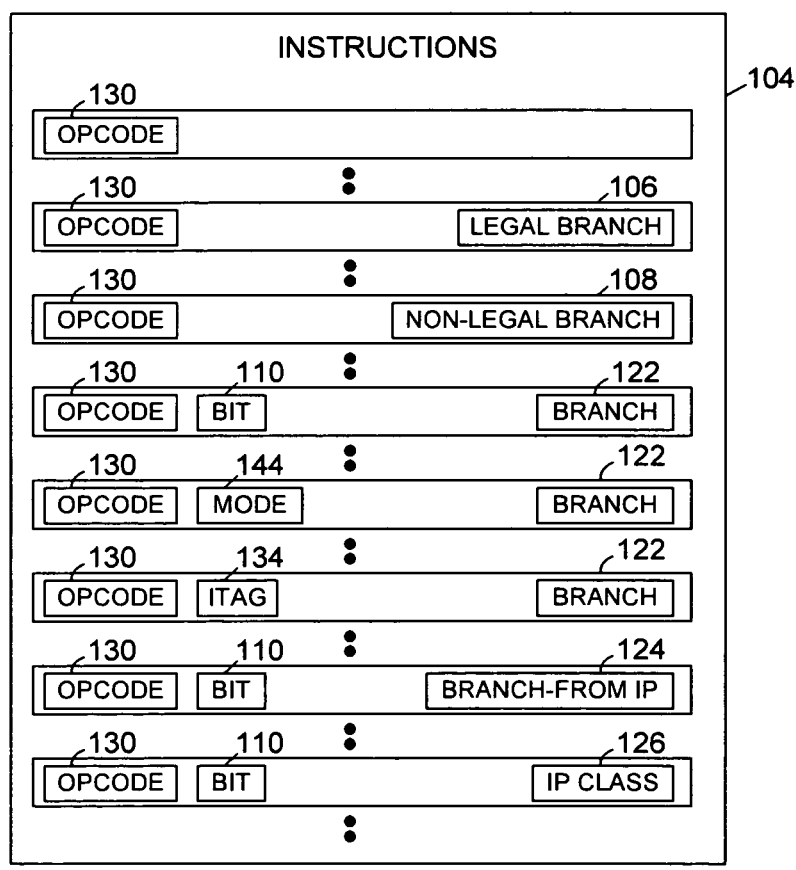
Figure 1C:
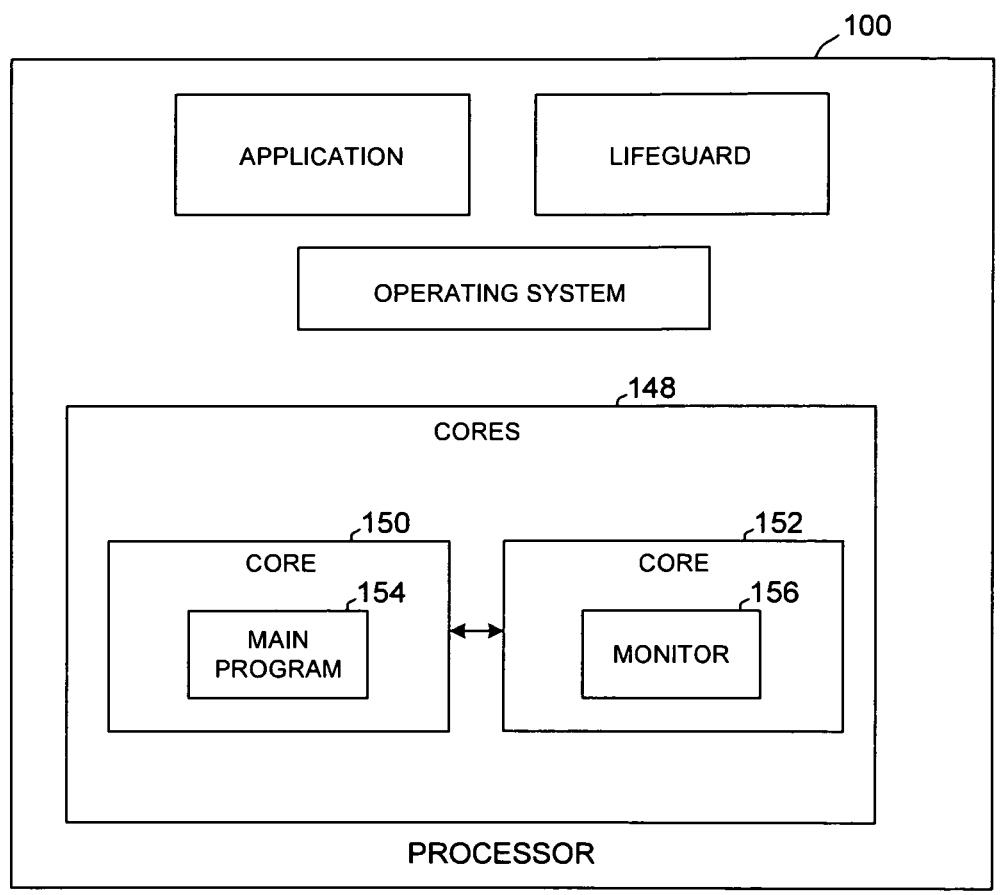

Referring to FIGS. 1A, 1B, and 1C respectively, a first schematic block diagram, a data structure, and a second schematic block diagram depict an embodiment of a processor 100 that is operable to ensure that program code can only be used for a designed purpose and not exploited by malware. One code integrity technique involves tagging legitimate branch targets or similarly to distinguish legitimate branch instructions from non-legitimate branch instructions. The illustrative processor 100 comprises logic 102 operable to execute a program instruction 104 and operable to distinguish whether the program instruction 104 is a legitimate branch instruction 106 or a non-legitimate branch instruction 108.

The distinction can be made by using a bit in each instruction. Accordingly, in some embodiments the processor 100 can further comprise logic 102 operable to execute a program instruction 104 which is operable to distinguish whether the program instruction 104 is a legitimate branch instruction 106 or a non-legitimate branch instruction 108 via a bit 110 in each program instruction 104.

The distinction can also be made by only allowing the instruction at the branch target to be a special instruction or class of instructions. Accordingly, in various embodiments the processor 100 can further comprise logic 102 operable to execute a program instruction 104 which is operable to distinguish whether the program instruction 104 is a legitimate branch instruction 106 or a non-legitimate branch instruction 108 according to whether the program instruction 104 is a predetermined special instruction or within a predetermined special class of instructions designated a legitimate branch target instruction.

Branch targets are relatively common so that usage of special instructions may be wasteful for an instruction set with 32-bit fixed-length instruction, but may be more suitable for an instruction set that supports 8-bit NOPs. Using a NOP from an existing instruction set as a legitimate branch target instruction has the advantage of backward compatibility so that new code so annotated would run on legacy machines. For example, x86 instruction set includes many 8-bit instructions such as XCHG EBX, EBX. Thus, in further embodiments the processor 100 can further comprise logic 102 operable to execute a program instruction 104 which is operable to distinguish whether the program instruction 104 is a legitimate branch instruction 106 or a non-legitimate branch instruction 108 according to whether the program instruction 104 is a No Operation (NOP) instruction of a legacy instruction set.

Legitimacy of the branch instruction can also be distinguished by using non-adjacent metadata such as by creating a datastructure indexed by the instruction pointer (IP) and associating the metadata with the IP. For example, in other embodiments the processor 100 can further comprise logic 102 operable to execute a program instruction 104 which is operable to distinguish whether the program instruction 104 is a legitimate branch instruction 106 or a non-legitimate branch instruction 108 according to whether the program instruction 104 is a metadata structure 112 indexed by an instruction pointer (IP) 114 wherein the metadata structure 112 is associated with the instruction pointer (IP) 114.

Legitimate branch target metadata can be any suitable size, even a single-bit, to specify that the instruction is permitted to be a branch target. Thus, in some embodiments the processor 100 can further comprise logic 102 operable to execute a program instruction 104 which is operable to distinguish whether the program instruction 104 is a legitimate branch instruction 106 or a non-legitimate branch instruction 108 according to whether the program instruction 104 is a single-bit legitimate branch target metadata 116 designating that the program instruction is permitted to be a branch target.

The metadata can be small dense metadata in the form of a bit per instruction pointer. Accordingly, an embodiment of the processor 100 can further comprise logic 102 operable to execute a program instruction 104 which is operable to distinguish whether the program instruction 104 is a legitimate branch instruction 106 or a non-legitimate branch instruction 108 according to whether the program instruction 104 is a small dense metadata 118 indexed by an instruction pointer (IP) 114 wherein the small dense metadata 118 is a bit per instruction pointer (IP) 114.

The legitimate branch instruction metadata can be a longer list, indicating the only IPs that are allowed to branch to the location. In some implementations, the metadata can be a sparse or relatively sparse metadata, for example a list of branch-from IPs or classes of IPs. Thus, an embodiment of the processor 100 can further comprise logic 102 operable to execute a program instruction 104 which is operable to distinguish whether the program instruction 104 is a legitimate branch instruction 106 or a non-legitimate branch instruction 108 according to a metadata structure 112 comprising a list 120 of instruction pointer (IP) 114 indicative of the only instruction pointer (IP) 114 that are allowed to branch to a location 122, the list 120 comprising branch-from Instruction Pointers (IPs) 124 or classes of Instruction Pointers (IPs) 126.

Any of the existing and well-known forms of memory metadata can be used for instruction annotations of legitimate branch targets.

Legitimacy of branch instructions can further be distinguished using in-band metadata, internally-generated metadata. Accordingly, an embodiment of the processor 100 can further comprise logic 102 operable to execute a program instruction 104 which is operable to distinguish whether the program instruction 104 is a legitimate branch instruction 106 or a non-legitimate branch instruction 108 according to in-band memory metadata 128 comprising a bit 110 in each instruction operation code (opcode) 130.

In-band metadata can be a bit in each instruction opcode, or an instruction set specifically designed to use in-band metadata. Thus, an embodiment of the processor 100 can further comprise logic 102 operable to execute a program instruction 104 which is operable to distinguish whether the program instruction 104 is a legitimate branch instruction 106 or a non-legitimate branch instruction 108 according to in-band memory metadata 128 comprising identification of specific legitimate branch target instructions 106.

In-band metadata can also be specific legitimate branch target instructions. For example, an embodiment of the processor 100 can further comprise logic 102 operable to execute a program instruction 104 which is operable to distinguish whether the program instruction 104 is a legitimate branch instruction 106 or a non-legitimate branch instruction 108 according to in-band memory metadata 128 comprising identification of specific legitimate branch target instructions 106.

Metadata can be configured in the form of out-of-band instruction tags or larger metadata such as a list of branch-froms. As a result, an embodiment of the processor 100 can further comprise logic 102 operable to execute a program instruction 104 which is operable to distinguish whether the program instruction 104 is a legitimate branch instruction 106 or a non-legitimate branch instruction 108 according to out-of-band memory metadata 132 comprising identification of instruction tags 134 and/or a branch-froms 124.

Any of the existing and well-known methods of representing metadata can be used to distinguish legitimacy of a branch instruction. Additional techniques such as in-band metadata can be enabled due to the particular circumstances of instruction set design.

In various embodiments, various techniques for enforcing legitimate branch targets can be implemented. For example, enforcement of branch targets can be performed in-line, or offline/out-of-line.

In an example of in-line enforcement, on a newly-specified design of an instruction set, a trap can be evoked if a branch is made to an instruction that is not a legitimate branch target. An embodiment of the processor 100 can further comprise logic 138 operable to execute a trap and/or exception 140 in response to a branch made to a program instruction 104 that is not a legitimate branch instruction 106.

In some embodiments, branch targets can be enforced according to mode. An embodiment of the processor 100 can further comprise logic 142 operable to control legitimate branch target enforcement according to a selectable operating mode 144 and operable to enable trap and/or exception 140 in response to a branch made to a program instruction 104 that is not a legitimate branch instruction 106.

A new mode can be created to implement legitimate branch target enforcement in a legacy or existing instruction set. By default the mode can be disabled. When enabled, checking can be done to enable in-line enforcement. Accordingly, an embodiment of the processor 100 can further comprise logic 142 operable to control legitimate branch target enforcement can be further operable to recognize and execute one or more instructions that control an operating mode 144 that enable and/or disable legitimate branch target enforcement.

A problem may arise when considering techniques for enabling and disabling the operating mode. Enablement can be controlled by appropriate instructions ENABLE/DISABLE_LEGITIMATE_BRANCH_TARGET_CHECKING, which might, for example, amount to a generic instruction setting a bit in a control register. Consequently, an embodiment of the processor 100 can further comprise the logic 142 operable to control legitimate branch target enforcement which is further operable to recognize and execute one or more instructions that control an operating mode 144 that enable and/or disable legitimate branch target enforcement by setting a bit in a control register 146.

A capability to check inside particular functions may be a desirable functionality, for example checking close to a function call entry point, and disabling on return from the function. Hence, an embodiment of the processor 100 can further comprise the logic 142 operable to control legitimate branch target enforcement which is further operable to enable checking whether the program instruction 104 is a legitimate branch instruction 106 or a non-legitimate branch instruction 108 within predetermined functions proximal to an entry point for a function call, and operable to disable checking on return from the function.

Another possibility can be to implicitly indicate where such checking is done by out-of-band metadata, a functionality that can be particularly well-suited to out-of-line checking. Hence, an embodiment of the processor 100 can further comprise the logic 142 operable to control legitimate branch target enforcement that is further operable to implicitly indicate a position where checking of whether the program instruction 104 is a legitimate branch instruction 106 or a non-legitimate branch instruction 108 is performed via out-of-band memory metadata 132.

Enforcement of branch targets can be performed offline/out-of-line. For example, checking can be done out-of-line, by a separate thread. Accordingly, embodiments of the processor 100 can further comprise the logic 142 operable to control legitimate branch target enforcement that is further operable to distinguish whether the program instruction 104 is a legitimate branch instruction 106 or a non-legitimate branch instruction 108 out-of-line via a thread separate from a thread executing the logic 102 operable to execute a program instruction 104.

In some embodiments, legitimate branch targets can be enforced in a log-based architecture configuration. For example, referring to FIG. 1C, the processor 100 can comprise a plurality of execution cores 148 comprising at least a first core 150 operable to run a main program 154 comprising the program instruction 104 and a second core 152. The processor 100 can further comprise a monitoring program 156 operable to run on the second core 152 and operable to distinguish whether the program instruction 104 is a legitimate branch instruction 106 or a non-legitimate branch instruction 108 out-of-line from execution of the main program 154.

The various techniques disclosed herein for enforcing and/or checking the legitimate branch target rules can be applied to any of the forms of legitimate branch targets, ranging from the simple forms described hereinabove and more advanced forms described hereinafter.

Additional types of legitimate branch targets can supplement the described techniques of 1-bit tags indicating whether or not the instruction is a legitimate branch target, a list of legitimate branch-from address for a particular legitimate branch target, and the like.

Additional techniques can include a local branch only wherein an instruction is allowed to be branched to only by "local" code. Thus, the processor 100 wherein the logic 102 operable to execute a program instruction 104 is operable to permit only local branches to the program instruction 104.

Various techniques for identifying locality enable different aspects of functionality, for example in the manner that x86 segmentation supports near/far addressing. Locality can be considered to be implied by IP-relative branches with a limited offset, for example a 16-bit offset. Therefore, in some embodiments of the processor 100, the logic 102 operable to execute a program instruction 104 can be operable to permit only local branches to the program instruction 104 wherein locality is specified as an instruction pointer (IP)-relative branch within a predetermined offset.

In some embodiments locality can be based on whether the instruction is an indirect branch target. Thus, the instruction either is or is not allowed to be branched to by an indirect branch. Typically, most such branching is prohibited. Therefore, in example embodiments of the processor 100, the logic 102 operable to execute a program instruction 104 can be operable to execute a program instruction 104 is operable to permit indirect branches to the program instruction 104. Similarly, the logic 102 operable to execute a program instruction 104 can be operable to prohibit indirect branches to the program instruction 104.

Legitimate branch target enforcement can be further managed in accompaniment with a list of indirect branch instructions that are allowed to branch to the location of the program instruction. One list if typically sufficient, although some optimizations replicate the indirect branch of a CASE statement. Thus, in some embodiments of the processor 100, the logic 102 operable to execute a program instruction 104 can be operable to permit only indirect branches to the program instruction 104, wherein the processor 100 further comprises a list of permitted indirect branch instructions.

In some embodiments locality can be based on whether the instruction is a return. Thus, returning to a particular instruction can be allowed or prohibited. For example, in some embodiments of the processor 100, the logic 102 operable to execute a program instruction 104 can be operable to permit returns to the program instruction 104. Similarly, the logic 102 operable to execute a program instruction 104 can be operable to prohibit returns to the program instruction104.

Any of the disclosed techniques, including in-line tags or instructions, out-of-line handling can otherwise be used. However, the special case of CALL/RETurn permits some optimization. On a fixed-length instruction set, the return instruction pointer can simply be decremented by the instruction width, and the presence of a corresponding CALL instruction checked. This technique is operable even on variable-length instruction sets if the CALL instruction is fixed length. Consequently, in some embodiments of the processor 100, the logic 102 operable to execute a program instruction 104 can be operable to execute instructions comprising at least one fixed length CALL instruction wherein a return instruction pointer (IP) 114 is decremented by an instruction width and checking for presence of a CALL instruction is performed.

On more variable-length instruction sets, for example, the calling convention can be redefined to record the instruction pointer (IP) of the CALL instruction, not the instruction following the CALL. The RETurn instruction can ensure that a CALL instruction is at the correct position or location, before incrementing the instruction pointer (IP) to resume execution at the instruction after the CALL. Thus, in various embodiments of the processor 100, the logic 102 operable to execute a program instruction 104 can be operable to execute instructions comprising at least one variable length CALL instruction wherein an instruction pointer (IP) 114 of a CALL instruction is recorded and a RETurn instruction associated with the CALL instruction ensures position of the CALL instruction before incrementing the instruction pointer (IP) 114 to resume execution after the CALL instruction.

Techniques to prevent return address stack overflow, such as stack shadowing, can be insufficient to manage such CALL/RETurn handling.

A list of places from which a RETurn is allowed can be supported. Also generic indications such as "local" versus "remote" can be used. Thus, in some embodiments of the processor 100, the logic 102 operable to execute a program instruction 104 can be operable to execute a RETurn instruction correspond to a CALL instruction, wherein the processor 100 further comprises a list of locations from which a RETurn is permitted.

Legitimate branch target enforcement can be further managed using an NX-bit branch-from. The current instruction can be a legitimate branch target of code that is (or is not) marked as read-only executable code. A default condition can be that branches are allowed only from read-only code. In an example implementation, only instructions that are expected to be "branched-to" from writable code pages can be marked, for instance instructions that are permitted targets for code generation such as self-modifying code (SMC). Hence, in example embodiments of the processor 100, the logic 102 operable to execute a program instruction 104 can be operable to execute a program instruction 104 comprising an operation code (opcode) field including a branch-from bit designating whether the program instruction 104 is a legitimate branch target that is marked/not-marked as read-only executable code.

Management of legitimate branch target enforcement using the NX bit has some inefficiencies in comparison to techniques such as implementing a new mode, but may be more suitable when configured in the manner of "from pages marked with the NX bit when NX bit checking is disabled."

Legitimate branch target enforcement can be further managed using a CALL target, wherein the current instruction either is or is not allowed to be the target of a CALL. Accordingly, embodiments of the processor 100 can include the logic 102 operable to execute a program instruction 104 which can be operable to execute a program instruction 104 is operable to execute a program instruction 104 comprising a CALL target instruction designating that the program instruction 104 is a legitimate branch target.

The CALL target can be implemented using any of the disclosed techniques including tag bits, special instructions, out-of-band metadata, and the like. That the techniques approximate a function can may enable usage of "standard" special instructions such as the x86 ENTER instruction, instead of a new ENTRY_POINT instruction.

A generic CALL target can be used, or a list of permitted CALL targets or classes such as local, global, and the like.

Figure 2:
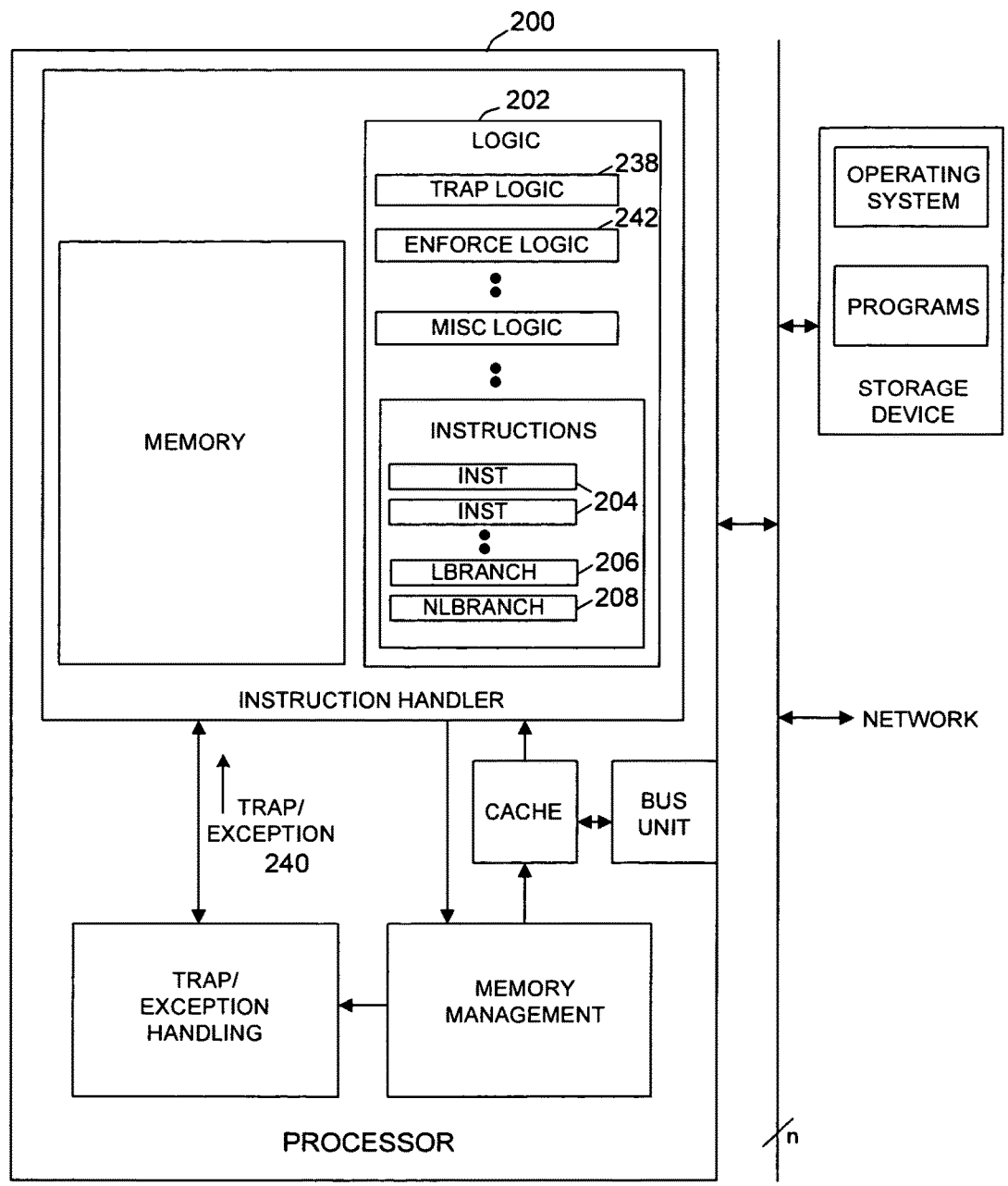
FIG. 2 is a schematic block diagram showing an embodiment of a processor configured to evoke a trap if a branch is made to an instruction that is not a legitimate branch target.

Referring to FIG. 2, a schematic block diagram depicts an embodiment of a processor 200 configured for in-line enforcement on a newly-specified design of an instruction set. A trap can be evoked if a branch is made to an instruction that is not a legitimate branch target. An embodiment of the processor 200 can further logic 238 operable to execute a trap and/or exception 240 in response to a branch made to a program instruction 204 that is not a legitimate branch instruction 206.

In some embodiments, the processor 200 can further comprise logic 242 operable to control legitimate branch target enforcement according to a selectable operating mode and operable to enable the logic 238 operable to execute a trap and/or exception 240 when the operating mode is selected.

In further embodiments, the processor 200 can further comprise logic 242 operable to control legitimate branch target enforcement which is further operable to recognize and execute one or more instructions that control an operating mode that enable and/or disable legitimate branch target enforcement.

In additional embodiments, the processor 200 can further comprise logic 242 operable to control legitimate branch target enforcement which is further operable to recognize and execute one or more instructions that control an operating mode that enable and/or disable legitimate branch target enforcement by setting a bit in a control register.

In other example embodiments, the processor 200 can further comprise logic 242 operable to control legitimate branch target enforcement which is further operable to enable checking whether the program instruction 204 is a legitimate branch instruction 206 or a non-legitimate branch instruction 208 within predetermined functions proximal to an entry point for a function call, and operable to disable checking on return from the function.

In some other embodiments, the processor 200 can further comprise logic 242 operable to control legitimate branch target enforcement which is further operable to implicitly indicate a position where checking of whether the program instruction 204 is a legitimate branch instruction 206 or a non-legitimate branch instruction 208 is performed via out-of-band metadata.

In some embodiments, the processor 200 can further comprise logic 202 operable to execute a program instruction 204 further operable to distinguish whether the program instruction 204 is a legitimate branch instruction 206 or a non-legitimate branch instruction 208 out-of-line via a thread separate from a thread executing the logic 202 operable to execute a program instruction 204.

In various embodiments, the processor 200 configured with a mode for legitimate branch target enforcement. A new mode can be created which implements legitimate branch target enforcement in a legacy or existing instruction set. By default the mode can be disabled. When enabled, checking can be done to enable in-line enforcement. Accordingly, an embodiment of the processor 200 can further comprise logic 242 operable to control legitimate branch target enforcement can be further operable to recognize and execute one or more instructions that control an operating mode that enable and/or disable legitimate branch target enforcement.

Figure 3:
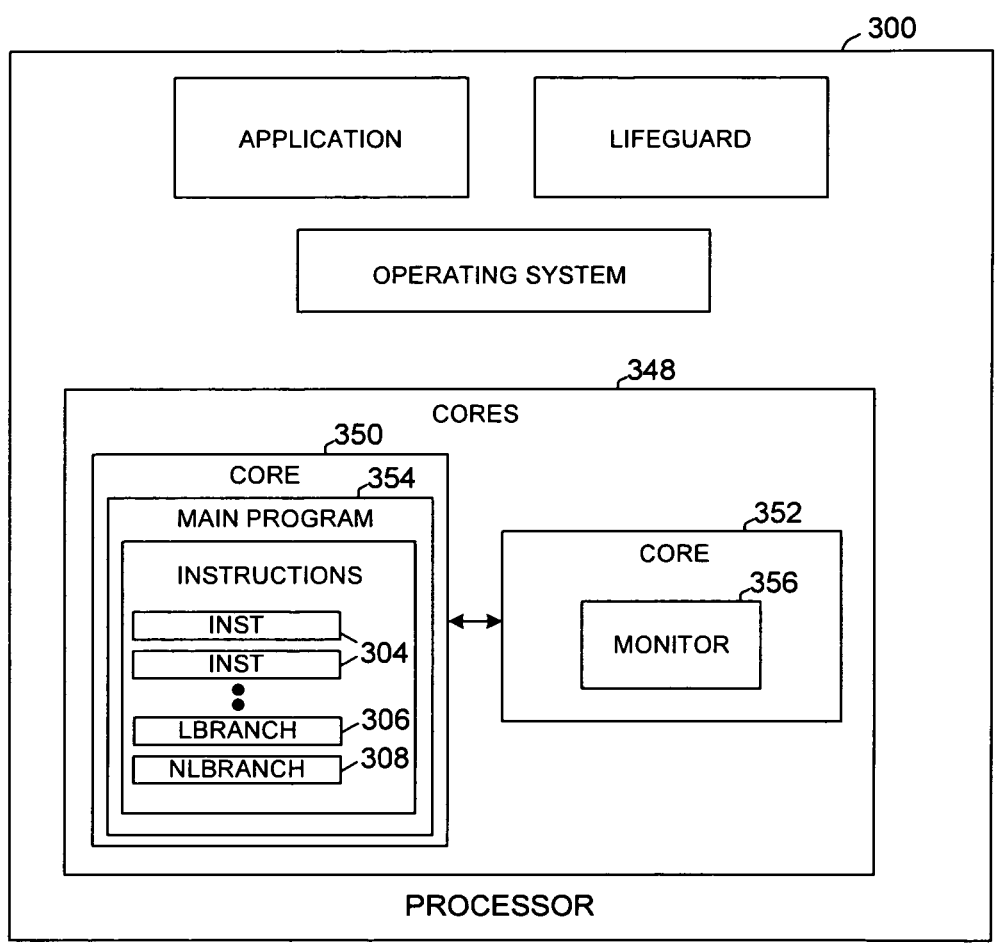
FIG. 3 is a schematic block diagram demonstrating an embodiment of a processor configured to enforce legitimate branch targets in a log-based architecture configuration.

Referring to FIG. 3, a schematic block diagram depicts an embodiment of a processor 300 configured to enforce legitimate branch targets in a log-based architecture configuration. The processor 300 can comprise a plurality of execution cores 348 comprising at least a first core 350 operable to run a main program 354 comprising the program instruction 304 and a second core 352. The processor 300 can further comprise a monitoring program 356 operable to run on the second core 352 and operable to distinguish whether the program instruction 304 is a legitimate branch instruction 306 or a non-legitimate branch instruction 308 out-of-line from execution of the main program 354.

Figure 4A:
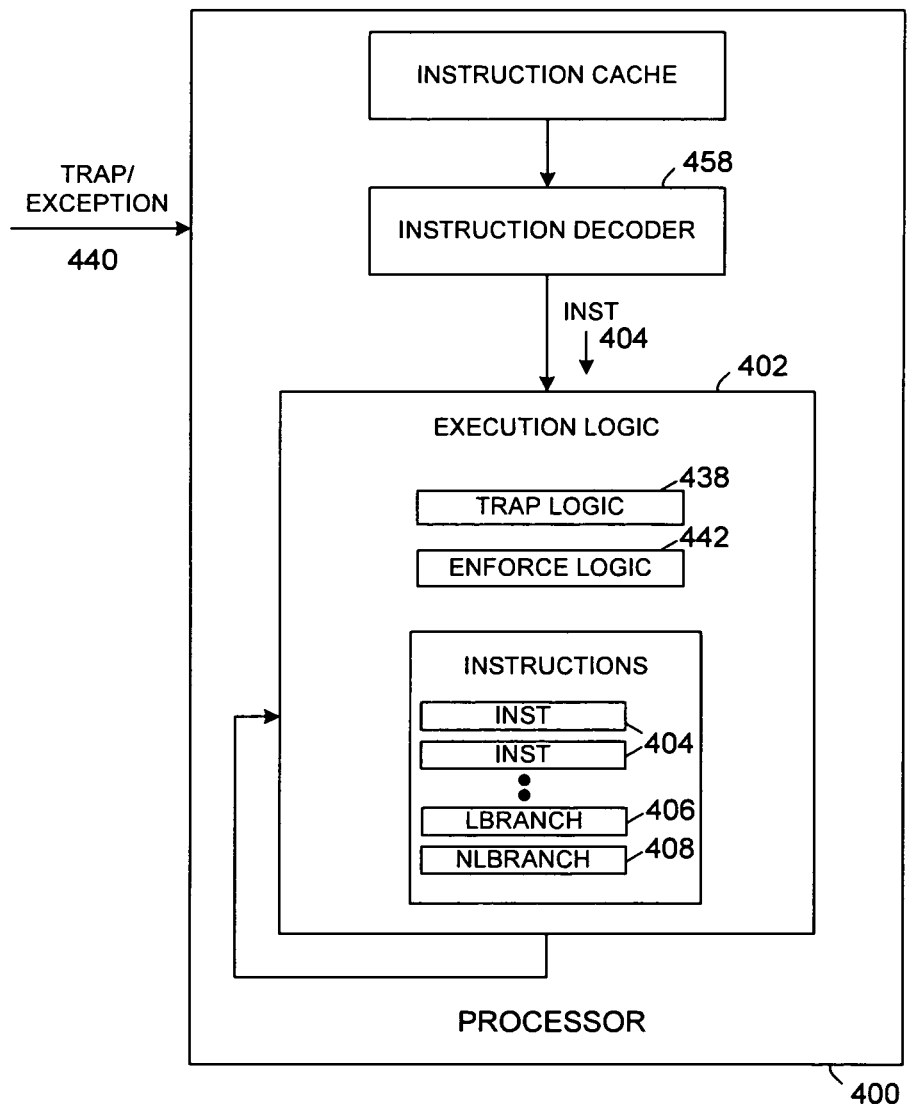
FIGS. 4A and 4B are schematic block diagrams illustrating another embodiment of a processor that is operable to ensure that program code can only be used for a designed purpose and not exploited by malware.
Figure 4B:
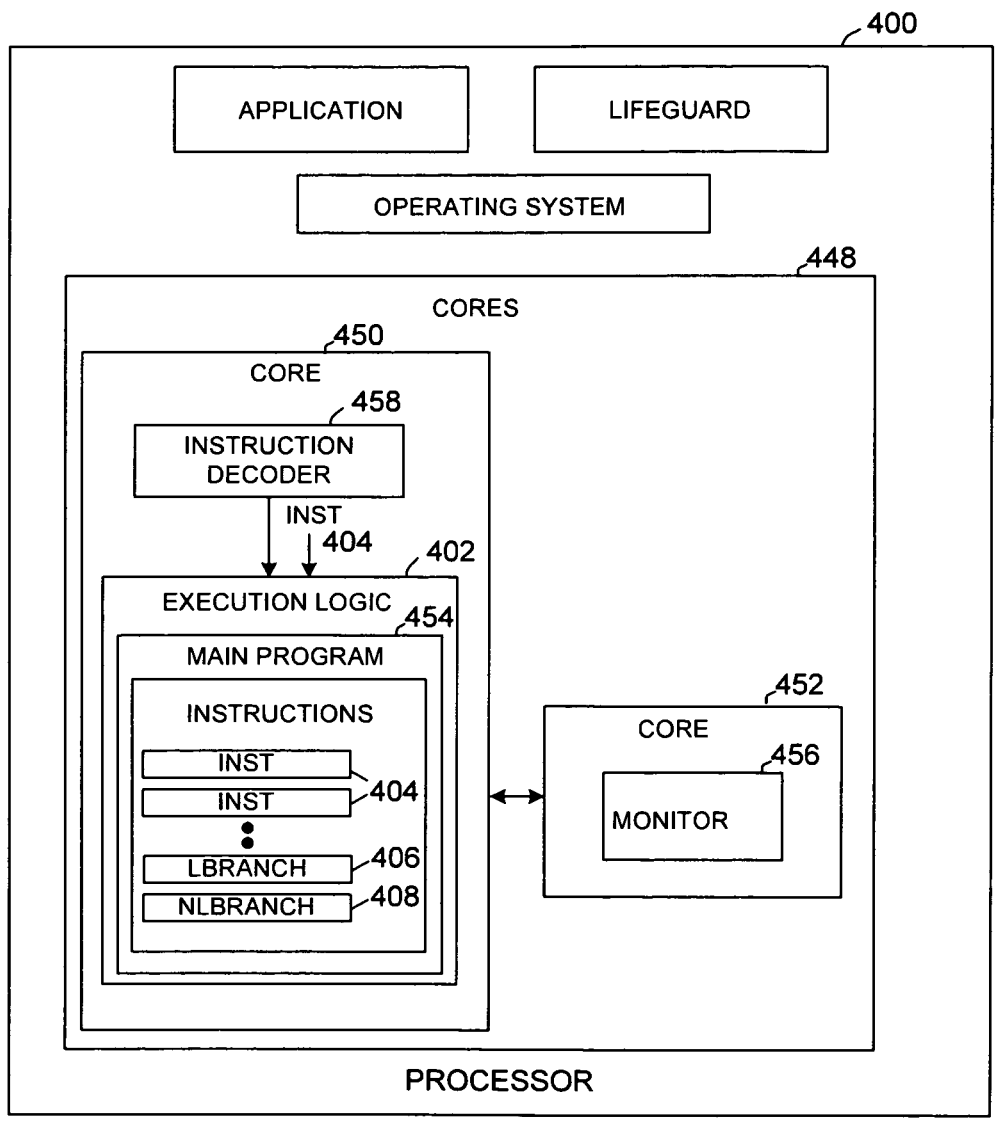

Referring to FIGS. 4A and 4B, schematic block diagrams illustrate another embodiment of a processor 400 that is operable to ensure that program code can only be used for a designed purpose and not exploited by malware. In an example embodiment, the processor 400 can comprise an instruction decoder 458 operable to decode a program instruction 404, and an executable logic 402 coupled to the instruction decoder 458 and operable to execute the program instruction 404 and operable to distinguish whether the program instruction 404 is a legitimate branch instruction 406 or a non-legitimate branch instruction 408.

In some embodiments, the processor 400 can further comprise logic 438 operable to execute a trap and/or exception 440 in response to a branch made to a program instruction 404 that is not a legitimate branch instruction 406.

In various embodiments, the processor 400 can further comprise logic 442 operable to control legitimate branch target enforcement according to a selectable operating mode and operable to enable trap and/or exception in response to a branch made to a program instruction 404 that is not a legitimate branch instruction 406.

In further embodiments, the processor 400 can further comprise logic 442 operable to control legitimate branch target enforcement is further operable to recognize and execute one or more instructions that control an operating mode 444 that enable and/or disable legitimate branch target enforcement.

As shown in FIG. 4B, a further embodiment of a processor 400 comprises a plurality of execution cores 448 comprising at least a first core 450 operable to run a main program 454 comprising the program instruction 404 and a second core 452, and a monitoring program 456. The monitoring program 456 is operable to run on the second core 452 and operable to distinguish whether the program instruction 404 is a legitimate branch instruction 406 or a non-legitimate branch instruction 408 out-of-line from execution of the main program 454.

Figure 5A:
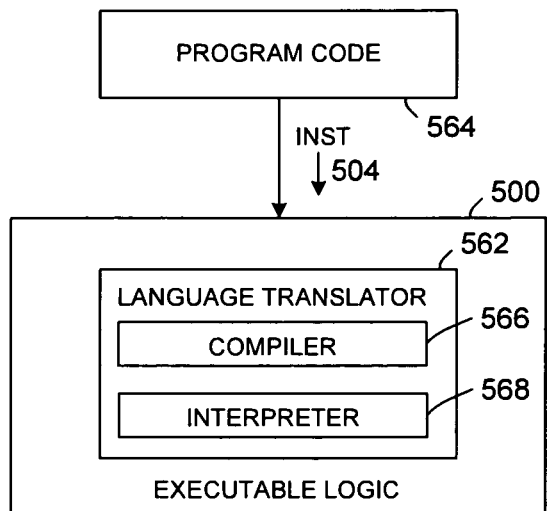
FIGS. 5A, 5B, and 5C are respectively a first schematic block diagram, a data structure diagram, and a second schematic block diagram showing an embodiment of an executable logic that can be used to ensure program code can only be used for a designed purpose and not exploited by malware.
Figure 5B:
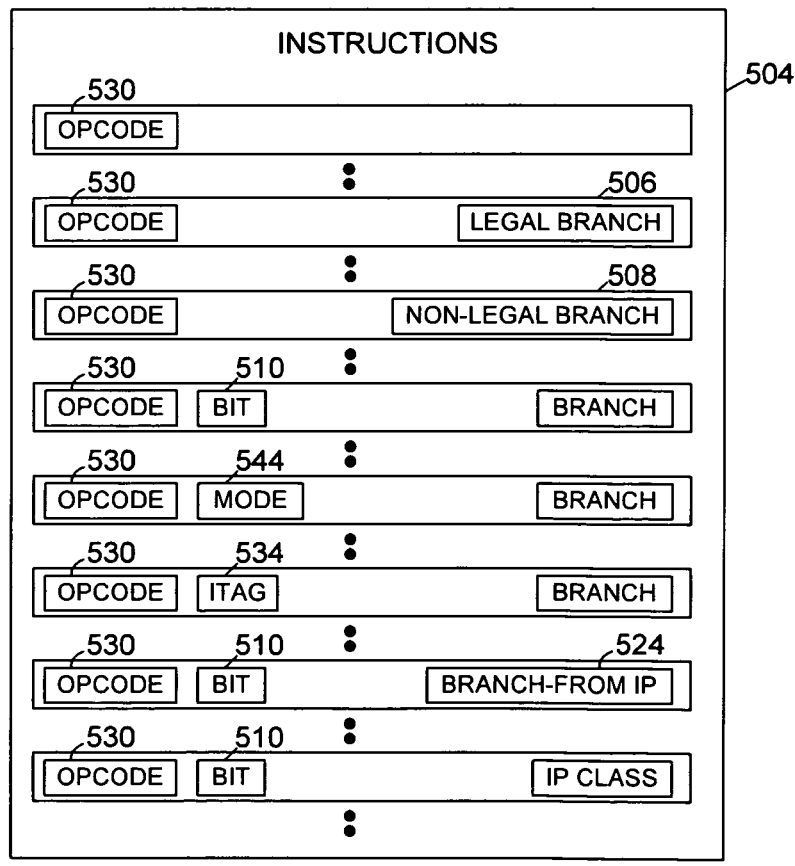
Figure 5C:
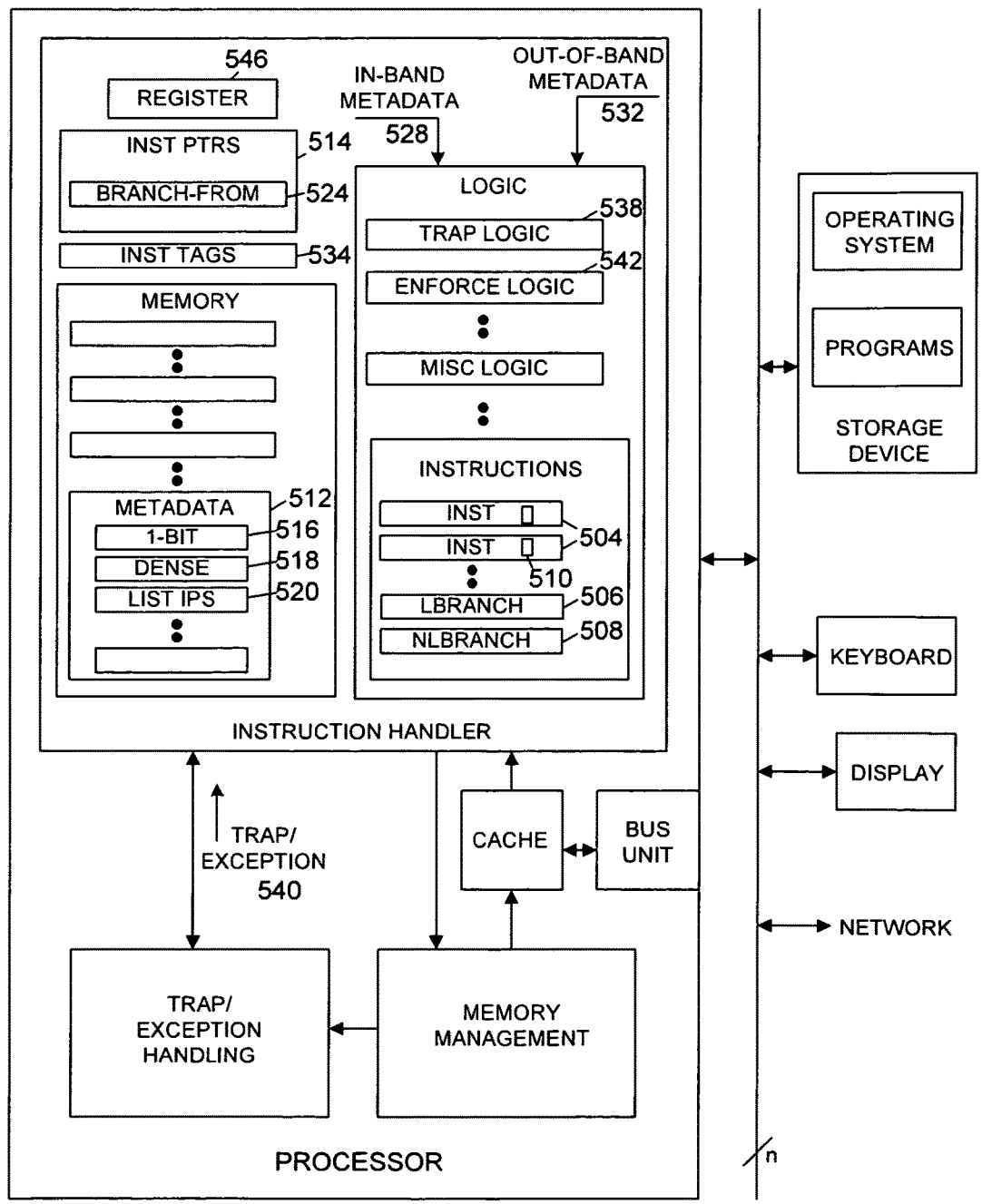

Referring to FIGS. 5A, 5B, and 5C, a first schematic block diagram, a data structure diagram, and a second schematic block diagram respectively show an embodiment of an executable logic 500 that can be used to ensure program code can only be used for a designed purpose and not exploited by malware. The illustrative executable logic 500 can comprise a computer language translator 562 operable to translate a program code 564 comprising a plurality of instructions including at least one program instruction 504 specified to distinguish whether the program instruction 504 is a legitimate branch instruction 506 or a non-legitimate branch instruction 508.

In various embodiments, the computer language translator 562 can be any suitable translator such as a compiler 566 operable to compile the program code 564, an interpreter 568 operable to interpret the program code 564, or any other functional element operable to translate the program code 564.

In example embodiments, the program instruction 504 can comprise a bit 510 that specifies the program instruction 504 as a legitimate branch instruction 506 or a non-legitimate branch instruction 508.

Also in some embodiments, the program instruction 504 can be specified as a legitimate branch instruction 506 or a non-legitimate branch instruction 508 according to whether the program instruction 504 is a predetermined special instruction or within a predetermined special class of instructions designated a legitimate branch target instruction.

In particular example embodiments, the program instruction 504 can be specified as a legitimate branch instruction 506 or a non-legitimate branch instruction 508 according to whether the program instruction 504 is a No Operation (NOP) instruction of a legacy instruction set.

In various specific embodiments, the program instruction 504 can be specified as a legitimate branch instruction 506 or a non-legitimate branch instruction 508 according to whether the program instruction 504 is a metadata structure 512 indexed by an instruction pointer (IP) 514 wherein the metadata structure 512 is associated with the instruction pointer (IP) 514.

Other particular embodiments of the executable logic 500, the program instruction 504 can be specified as a legitimate branch instruction 506 or a non-legitimate branch instruction 508 according to whether the program instruction 504 is a single-bit legitimate branch target metadata 516 designating that the program instruction 504 is permitted to be a branch target.

In example embodiments, the program instruction 504 can be specified as a legitimate branch instruction 506 or a non-legitimate branch instruction 508 according to whether the program instruction 504 is a small dense metadata 518 indexed by an instruction pointer (IP) 514 wherein the small dense metadata 518 is a bit per instruction pointer (IP) 514.

Also in some embodiments, the program instruction 504 can be specified as a legitimate branch instruction 506 or a non-legitimate branch instruction 508 according to a metadata structure 512 comprising a list of instruction pointer (IP) 514 indicative of the only instruction pointer (IP) 514 that are allowed to branch to a location, the list 520 comprising branch-from instruction pointer (IP) 514 or classes of instruction pointer (IP) 514.

In particular example embodiments, the program instruction 504 can be specified as a legitimate branch instruction 506 or a non-legitimate branch instruction 508 according to in-band memory metadata 528 comprising a bit in each instruction operation code (opcode) 530.

In various specific embodiments, the program instruction 504 can be specified as a legitimate branch instruction 506 or a non-legitimate branch instruction 508 according to in-band memory metadata 528 comprising identification of specific legitimate branch target instructions 506.

In other particular embodiments of the executable logic 500, the program instruction 504 can be specified as a legitimate branch instruction 506 or a non-legitimate branch instruction 508 according to out-of-band memory metadata 532 comprising identification of instruction tags 534 and/or a branch-froms 524.

In various embodiments, the executable logic 500 can further comprise logic 538 operable to execute a trap and/or exception 540 in response to a branch made to a program instruction 504 that is not a legitimate branch instruction 506.

In some embodiments, the executable logic 500 can further comprise logic 542 operable to control legitimate branch target enforcement according to a selectable operating mode 544 and operable to enable trap and/or exception in response to a branch made to a program instruction 504 that is not a legitimate branch instruction 506.

In particular embodiments of the executable logic 500, the logic 542 operable to control legitimate branch target enforcement is further operable to recognize and execute one or more instructions that control an operating mode 544 that enable and/or disable legitimate branch target enforcement.

Similarly, in some embodiments of the executable logic 500, the logic 542 operable to control legitimate branch target enforcement is further operable to recognize and execute one or more instructions that control an operating mode 544 that enable and/or disable legitimate branch target enforcement by setting a bit in a control register 546.

Also, in various embodiments of the executable logic 500, the logic 542 operable to control legitimate branch target enforcement is further operable to enable checking whether the program instruction 504 is a legitimate branch instruction 506 or a non-legitimate branch instruction 508 within predetermined functions proximal to an entry point for a function call, and operable to disable checking on return from the function.

Furthermore, in some embodiments of the executable logic 500, the logic 542 operable to control legitimate branch target enforcement is further operable to implicitly indicate a position where checking of whether the program instruction 504 is a legitimate branch instruction 506 or a non-legitimate branch instruction 508 is performed via out-of-band memory metadata.

In various embodiments, the executable logic 500 can further comprise logic operable to distinguish whether the program instruction 504 is a legitimate branch instruction 506 or a non-legitimate branch instruction 508 out-of-line via a thread separate from a thread executing the logic operable to execute a program instruction 504.

In some embodiments, the executable logic 500 can further comprise logic operable to permit only local branches to the program instruction 504.

In particular embodiments, the executable logic 500 can further comprise logic operable to permit only local branches to the program instruction 504 wherein locality is specified as an instruction pointer (IP)-relative branch within a predetermined offset.

Also, various embodiments of the executable logic 500 can comprise logic operable to permit only indirect branches to the program instruction 504. More specifically in some embodiments, the executable logic 500 can comprise logic operable to permit only indirect branches to the program instruction, wherein the processor further comprises a list of permitted indirect branch instructions. Conversely, some embodiments of the executable logic 500 can comprise logic operable to permit only direct branches to the program instruction 504.

In other variations, the executable logic 500 can comprise logic operable to permit returns to the program instruction. Conversely, some embodiments of the executable logic 500 can comprise logic operable to prohibit returns to the program instruction 504.

In some example embodiments, the executable logic 500 can comprise logic operable to execute instructions comprising at least one fixed length CALL instruction wherein a return instruction pointer (IP) 514 is decremented by an instruction width and checking for presence of a CALL instruction is performed. In a similar variation of some embodiments, the executable logic 500 can comprise logic operable to execute instructions comprising at least one variable length CALL instruction wherein an instruction pointer (IP) 514 of a CALL instruction is recorded and a RETurn instruction associated with the CALL instruction ensures position of the CALL instruction before incrementing the instruction pointer (IP) 514 to resume execution after the CALL instruction.

In various example embodiments, the executable logic 500 can comprise logic operable to execute a RETurn instruction correspond to a CALL instruction, wherein the executable logic 500 further comprises a list of locations from which a RETurn is permitted.

In a variety of embodiments, the executable logic 500 can comprise logic operable to execute a program instruction 504 comprising an operation code (opcode) field including a branch-from bit designating whether the program instruction 504 is a legitimate branch target that is marked/not-marked as read-only executable code.

In assorted embodiments, the executable logic 500 can comprise logic operable to execute a program instruction 504 comprising a CALL target instruction designating that the program instruction 504 is a legitimate branch target.

Referring to FIGS. 6A through 6BB, schematic flow charts illustrate an embodiment or embodiments of a method for ensuring program code can only be used for a designed purpose and not exploited by malware in a data processing system. As shown in FIG. 6A, an embodiment of a method 600 for controlling program flow in a data processing system can comprise executing 601 a program instruction, and distinguishing 602 whether the program instruction is a legitimate branch instruction or a non-legitimate branch instruction.

As shown in FIG. 6B, an embodiment of a method 603 can further comprise distinguishing 604 whether the program instruction is a legitimate branch instruction or a non-legitimate branch instruction via a bit in each program instruction.

FIG. 6C shows an embodiment of a method 605 further comprising determining 606 whether the program instruction is a predetermined special instruction or within a predetermined special class of instructions designated a legitimate branch target instruction. Whether the program instruction is a legitimate branch instruction or a non-legitimate branch instruction can be distinguished 607 according to whether the program instruction is a predetermined special instruction or within a predetermined special class of instructions designated a legitimate branch target instruction.

Figures 6D, 6E, 6F:
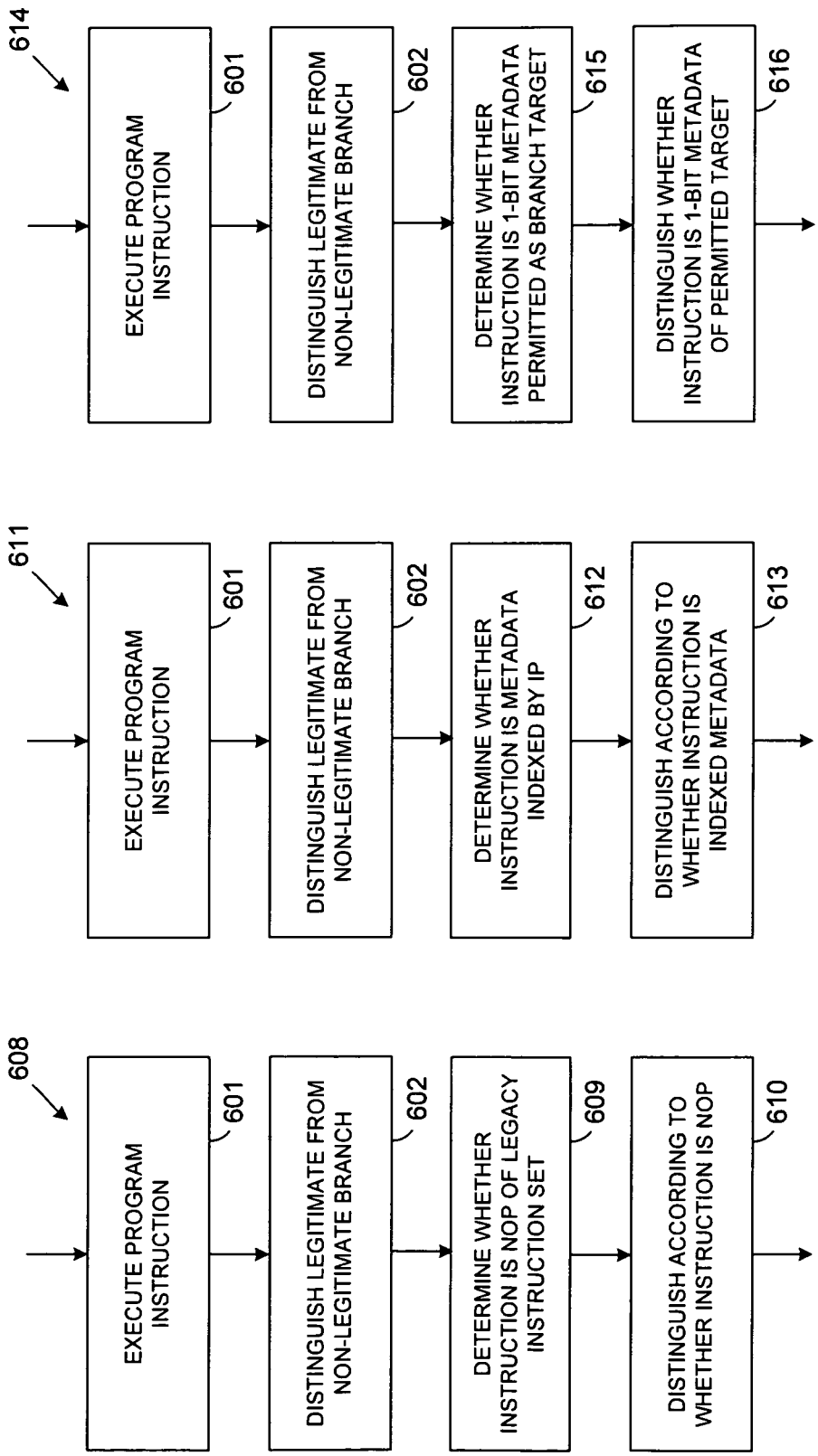

In some embodiments, as shown in FIG. 6D, the method 608 can comprise determining 609 whether the program instruction is a No Operation (NOP) instruction of a legacy instruction set. Whether the program instruction is a legitimate branch instruction or a non-legitimate branch instruction can be distinguished 610 according to whether the program instruction is a No Operation (NOP) instruction of a legacy instruction set.

Referring to FIG. 6E, some embodiments of a method 611 can comprise determining 612 whether the program instruction is a metadata structure indexed by an Instruction Pointer (IP) wherein the metadata structure is associated with the instruction pointer (IP). Whether the program instruction is a legitimate branch instruction or a non-legitimate branch instruction can be distinguished 613 according to whether the program instruction is a metadata structure indexed by an Instruction Pointer (IP) wherein the metadata structure is associated with the instruction pointer (IP).

As illustrated in FIG. 6F, one or more embodiments of a method 614 can comprise determining 615 whether the program instruction is a single-bit legitimate branch target metadata designating that the program instruction is permitted to be a branch target. Whether the program instruction is a legitimate branch instruction or a non-legitimate branch instruction distinguished 616 according to whether the program instruction is a single-bit legitimate branch target metadata designating that the program instruction is permitted to be a branch target.

Figure 6I:
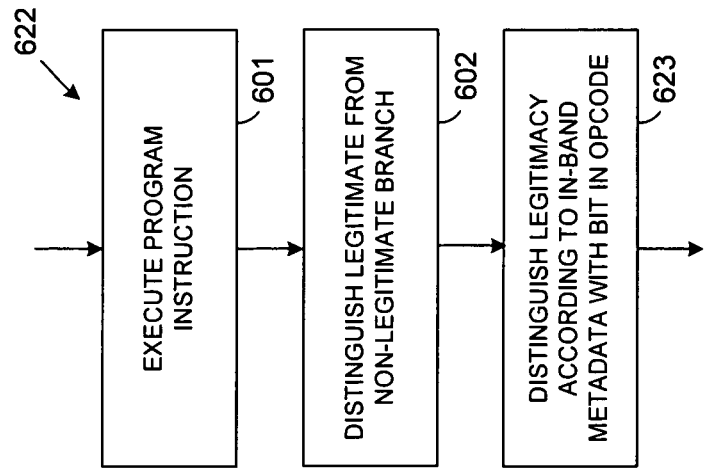
Figure 6H:
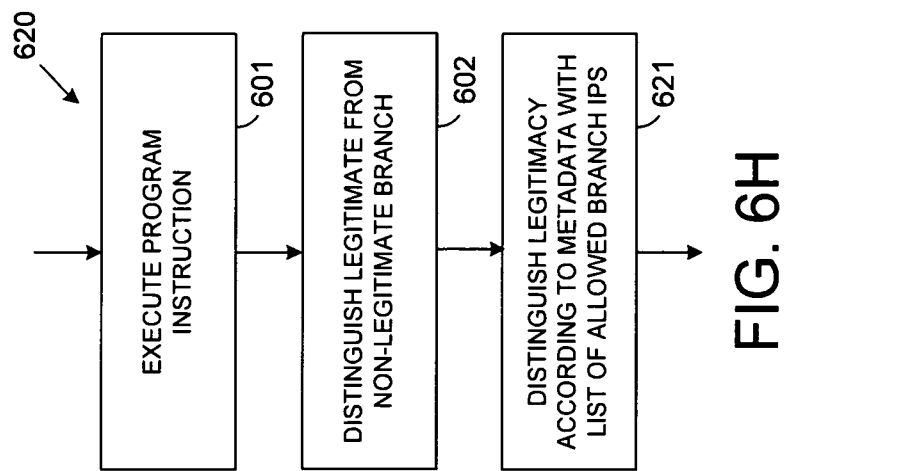
Figure 6G:
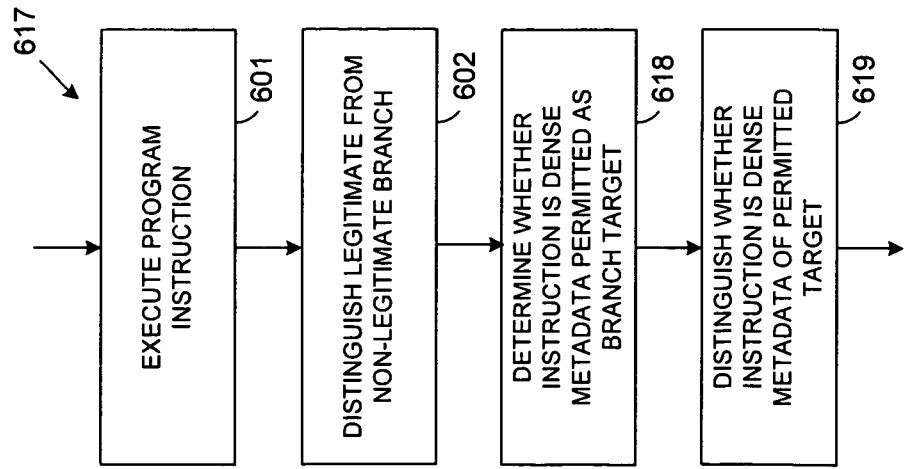

FIG. 6G shows an embodiment of a method 617 that further comprises determining 618 whether the program instruction is a small dense metadata indexed by an Instruction Pointer (IP) wherein the small dense metadata is a bit per instruction pointer (IP). Whether the program instruction is a legitimate branch instruction or a non-legitimate branch instruction can be distinguished 619 according to whether the program instruction is a small dense metadata indexed by an Instruction Pointer (IP) wherein the small dense metadata is a bit per instruction pointer (IP).

FIG. 6H depicts an embodiment of a method 620 further comprising distinguishing 621 whether the program instruction is a legitimate branch instruction or a non-legitimate branch instruction according to a metadata structure comprising a list of instruction pointer (IP) indicative of the only instruction pointer (IP) that are allowed to branch to a location, the list comprising branch-from Instruction Pointers (IPs) or classes of Instruction Pointers (IPs).

FIG. 6I illustrates an embodiment of a method 622 further comprising distinguishing 623 whether the program instruction is a legitimate branch instruction or a non-legitimate branch instruction according to in-band memory metadata comprising a bit in each instruction operation code (opcode).

Figure 6L:
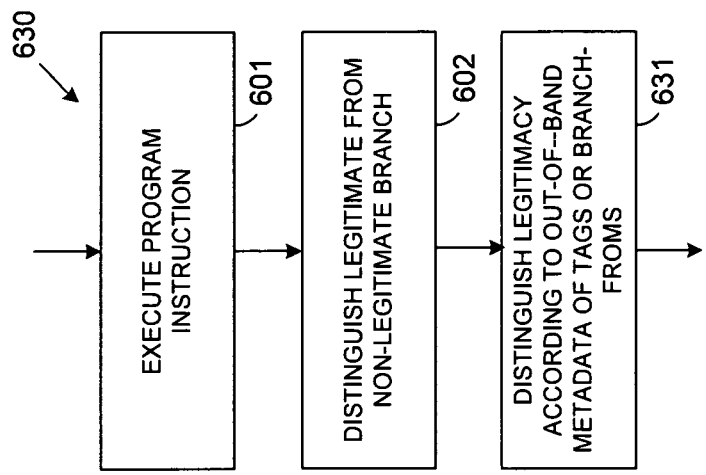
Figure 6K:
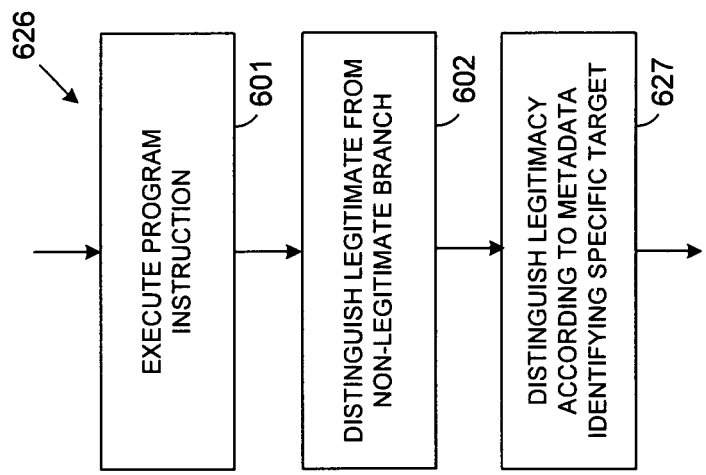
Figure 6J:
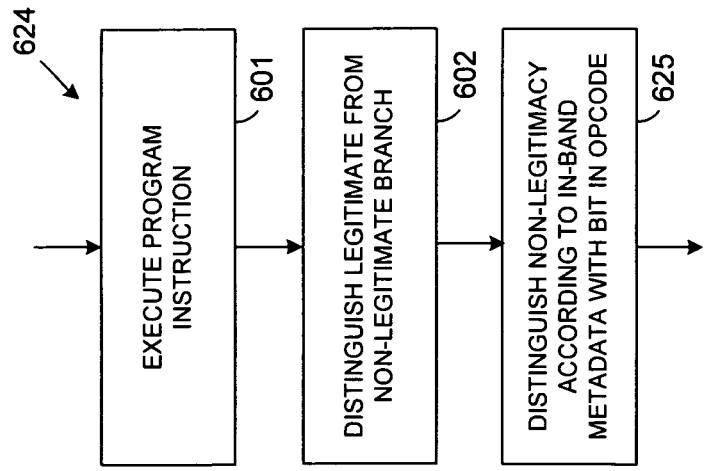

As shown in FIG. 6J, an embodiment of a method 624 can further comprise distinguishing 625 whether the program instruction is a legitimate branch instruction or a non-legitimate branch instruction according to in-band memory metadata comprising a bit in each instruction operation code (opcode).

FIG. 6K shows an embodiment of a method 626 further comprising distinguishing 627 whether the program instruction is a legitimate branch instruction or a non-legitimate branch instruction according to in-band memory metadata comprising identification of specific legitimate branch target instructions.

Referring to FIG. 6L, some embodiments of a method 630 can comprise distinguishing 631 whether the program instruction is a legitimate branch instruction or a non-legitimate branch instruction according to out-of-band memory metadata comprising identification of instruction tags and/or a branch-froms.

Figure 6O:
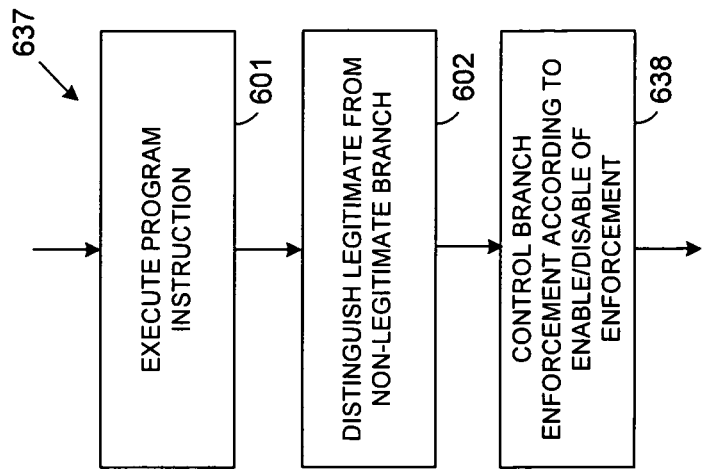
Figure 6N:
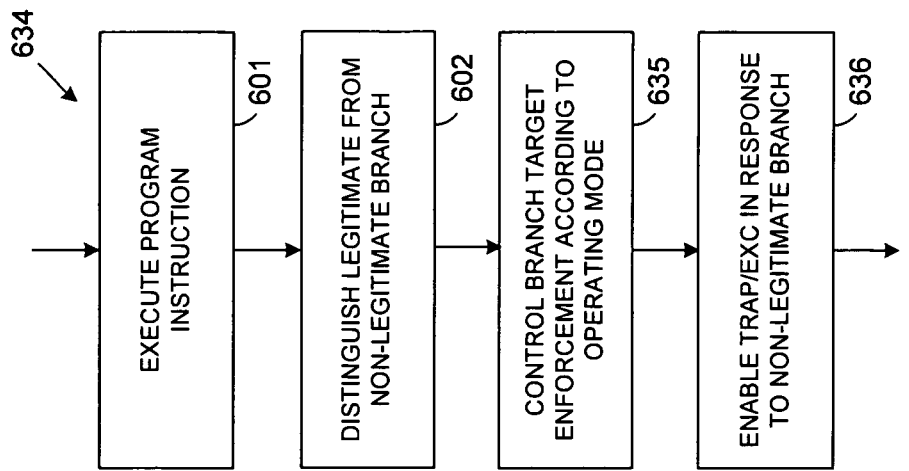
Figure 6M:
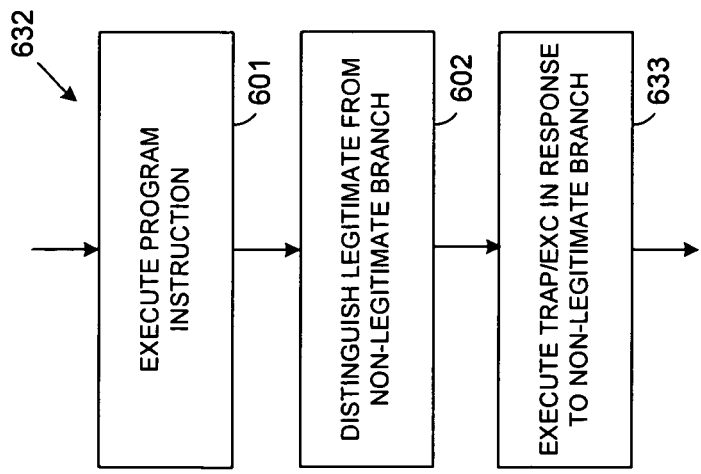

As illustrated in FIG. 6M, one or more embodiments of a method 632 can comprise executing 633 a trap and/or exception in response to a branch made to a program instruction that is not a legitimate branch instruction.

FIG. 6N shows an embodiment of a method 634 that further comprises controlling 635 legitimate branch target enforcement according to a selectable operating mode, and enabling 636 trap and/or exception in response to a branch made to a program instruction that is not a legitimate branch instruction.

FIG. 6O depicts an embodiment of a method 637 further comprising controlling 638 legitimate branch target enforcement according to a selectable that enables and/or disables legitimate branch target enforcement.

Figure 6R:
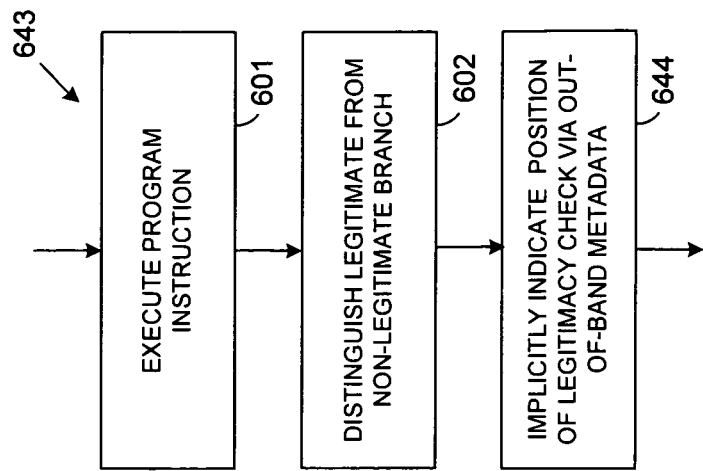
Figure 6Q:
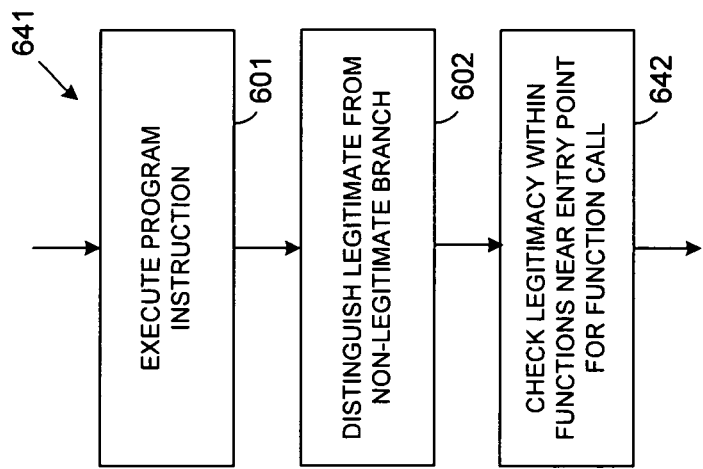
Figure 6P:
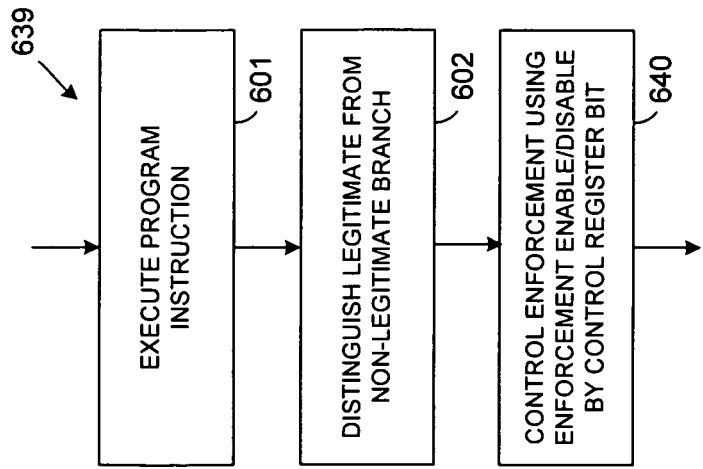

FIG. 6P illustrates an embodiment of a method 639 further comprising controlling 640 legitimate branch target enforcement according to a selectable that enables and/or disables legitimate branch target enforcement by setting a bit in a control register.

As shown in FIG. 6Q, an embodiment of a method 641 can further comprise checking 642 whether the program instruction is a legitimate branch instruction or a non-legitimate branch instruction within predetermined functions proximal to an entry point for a function call, and operable to disable checking on return from the function.

FIG. 6R shows an embodiment of a method 643 further comprising implicitly indicating 644 a position where checking of whether the program instruction is a legitimate branch instruction or a non-legitimate branch instruction is performed via out-of-band metadata.

Figure 6U:
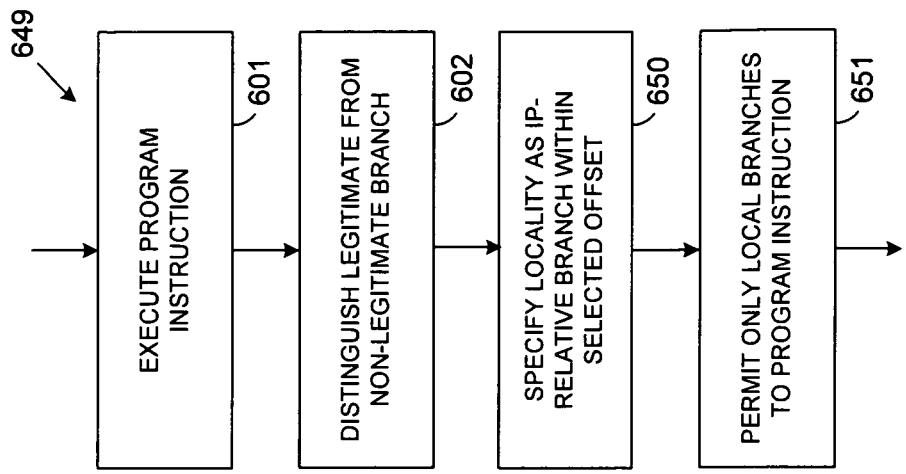
Figure 6T:
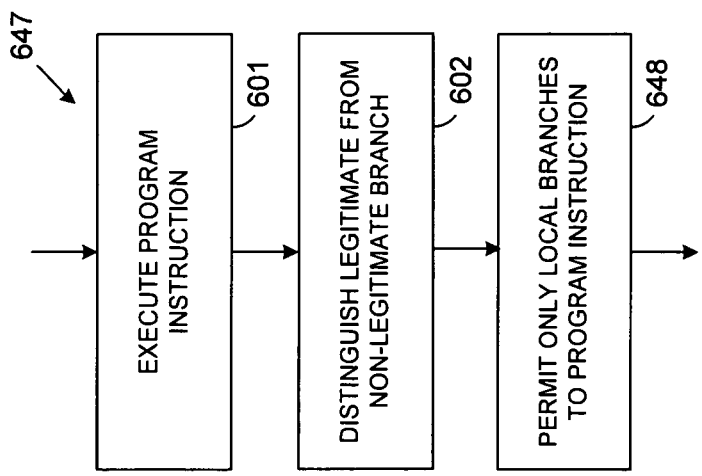
Figure 6S:
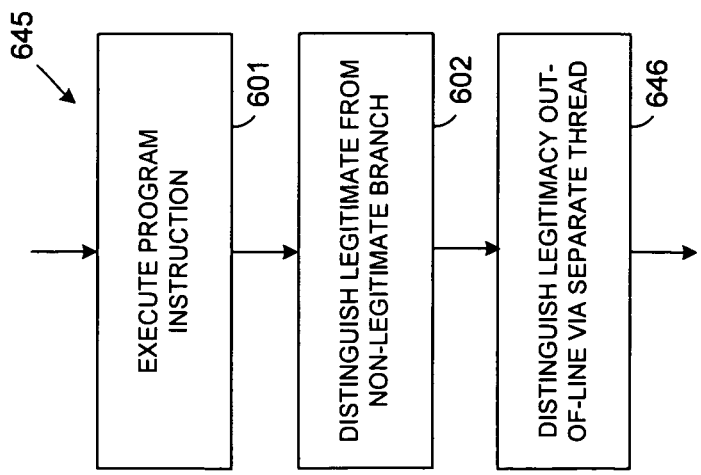

In some embodiments, as shown in FIG. 6S, the method 645 can comprise distinguishing 646 whether the program instruction is a legitimate branch instruction or a non-legitimate branch instruction out-of-line via a thread separate from a thread executing the logic.

Referring to FIG. 6T, some embodiments of a method 647 can comprise permitting 648 only local branches to the program instruction.

As illustrated in FIG. 6U, one or more embodiments of a method 649 can comprise specifying 650 locality as an instruction pointer (IP)-relative branch within a predetermined offset, and permitting 651 only local branches to the program instruction.

Figure 6V:
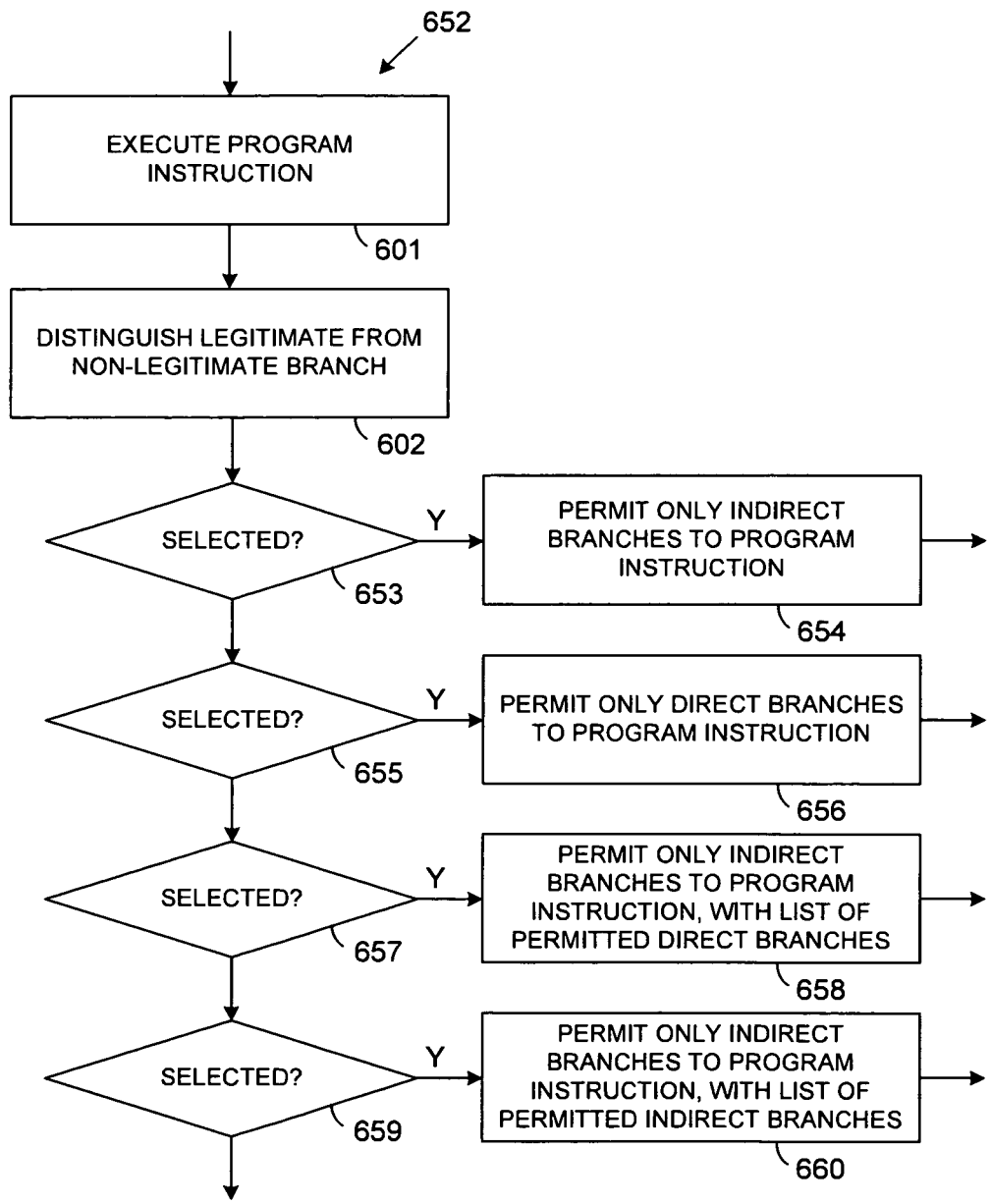

FIG. 6V shows an embodiment of a method 652 that further comprises, if selected 653, permitting 654 only indirect branches to the program instruction. If selected 655, the method 652 can further comprise permitting 656 only direct branches to the program instruction. Similarly, if selected 657, the method 652 can further comprise permitting 658 only indirect branches to the program instruction, wherein the processor further comprises a list of permitted indirect branch instructions. Also, if selected 659, the method 652 can comprise permitting 660 only indirect branches to the program instruction, wherein the processor further comprises a list of permitted indirect branch instructions.

Figure 6Y:
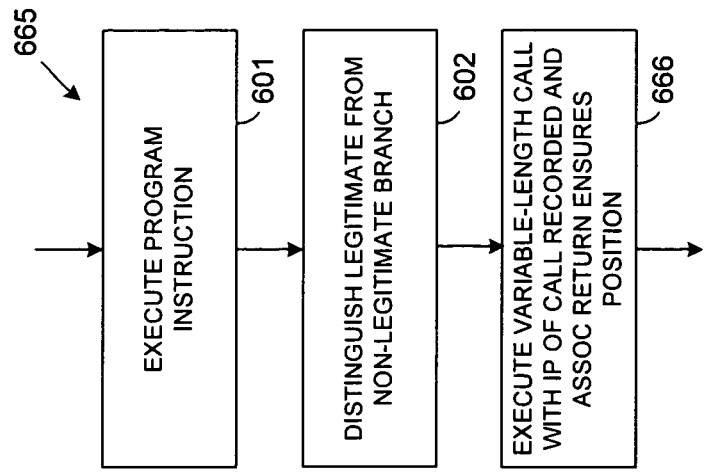
Figure 6X:
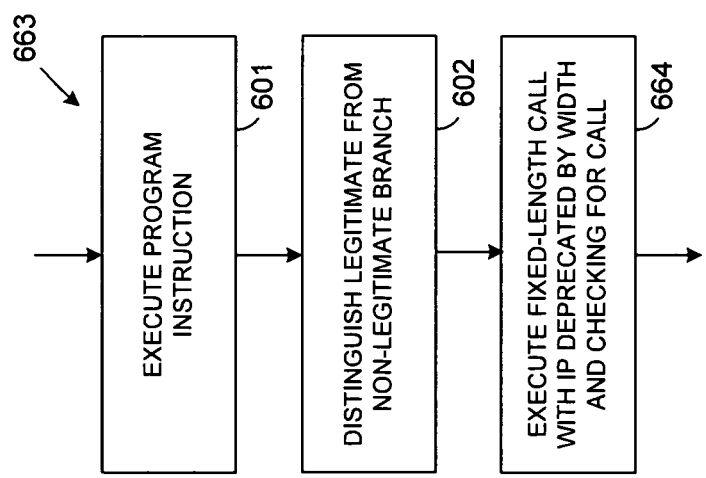
Figure 6W:
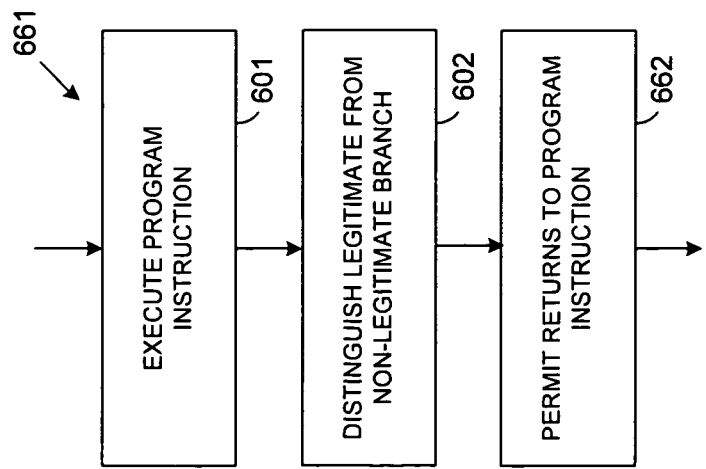

FIG. 6W depicts an embodiment of a method 661 further comprising permitting 662 returns to the program instruction.

FIG. 6X illustrates an embodiment of a method 663 further comprising executing 664 instructions comprising at least one fixed length CALL instruction wherein a return instruction pointer (IP) is decremented by an instruction width and checking for presence of a CALL instruction is performed.

As shown in FIG. 6Y, an embodiment of a method 665 can further comprise executing 666 instructions comprising at least one variable length CALL instruction wherein an instruction pointer (IP) of a CALL instruction is recorded and a RETurn instruction associated with the CALL instruction ensures position of the CALL instruction before incrementing the instruction pointer (IP) to resume execution after the CALL instruction.

FIG. 6Z shows an embodiment of a method 667 further comprising executing 668 a RETurn instruction correspond to a CALL instruction, wherein the processor further comprises a list of locations from which a RETurn is permitted.

In some embodiments, as shown in FIG. 6AA, the method 669 can comprise executing 670 a program instruction comprising an operation code (opcode) field including a branch-from bit designating whether the program instruction is a legitimate branch target that is marked/not-marked as read-only executable code.

Referring to FIG. 6BB, some embodiments of a method 671 can comprise executing 672 a program instruction comprising a CALL target instruction designating that the program instruction is a legitimate branch target.

Figure 7A:
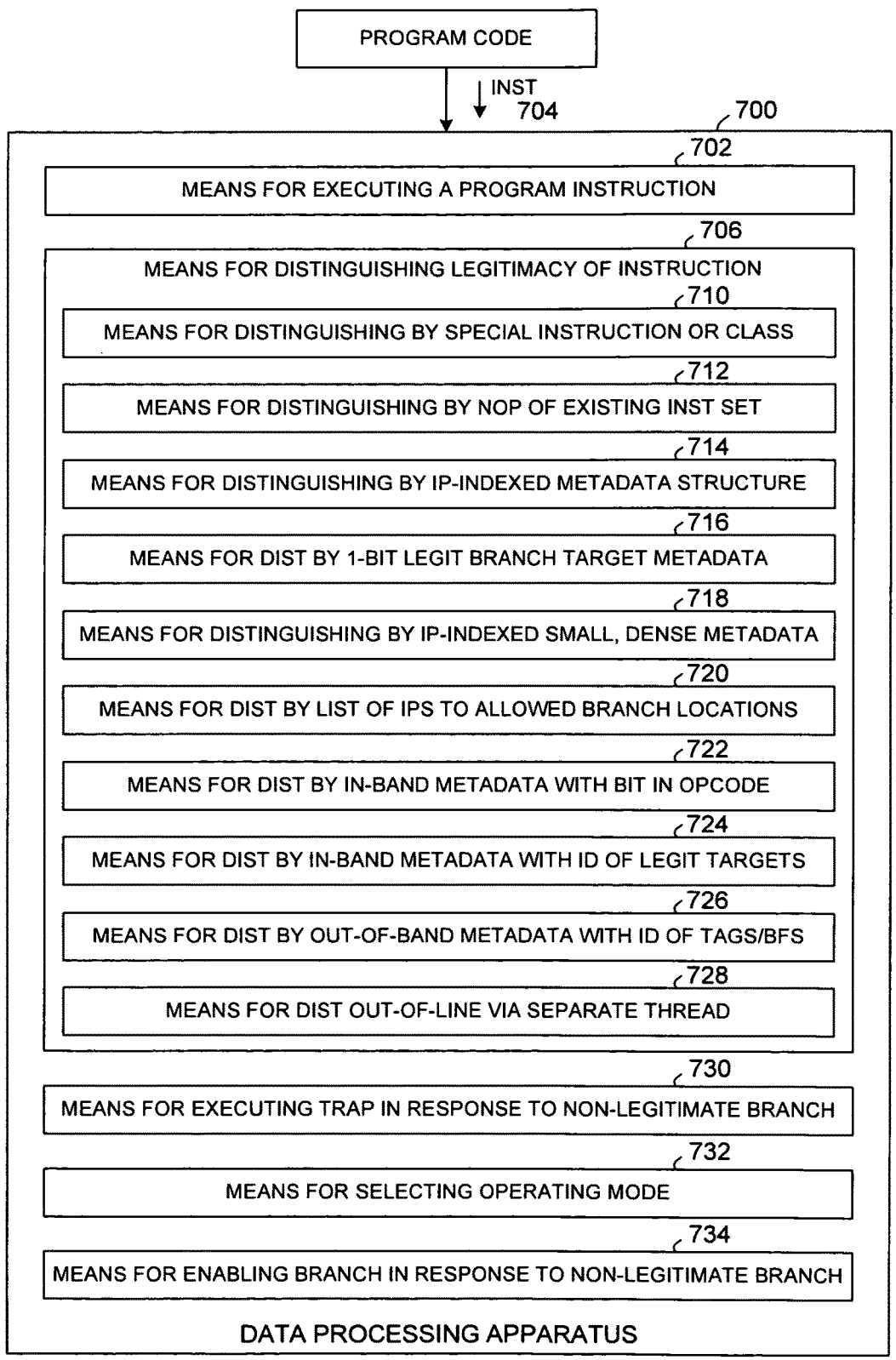
FIGS. 7A, 7B, and 7C are first, second, and third schematic block diagrams respectively illustrating an embodiment of a data processing apparatus for usage in ensuring program code can only be used for a designed purpose and not exploited by malware in a data processing system.
Figure 7B:
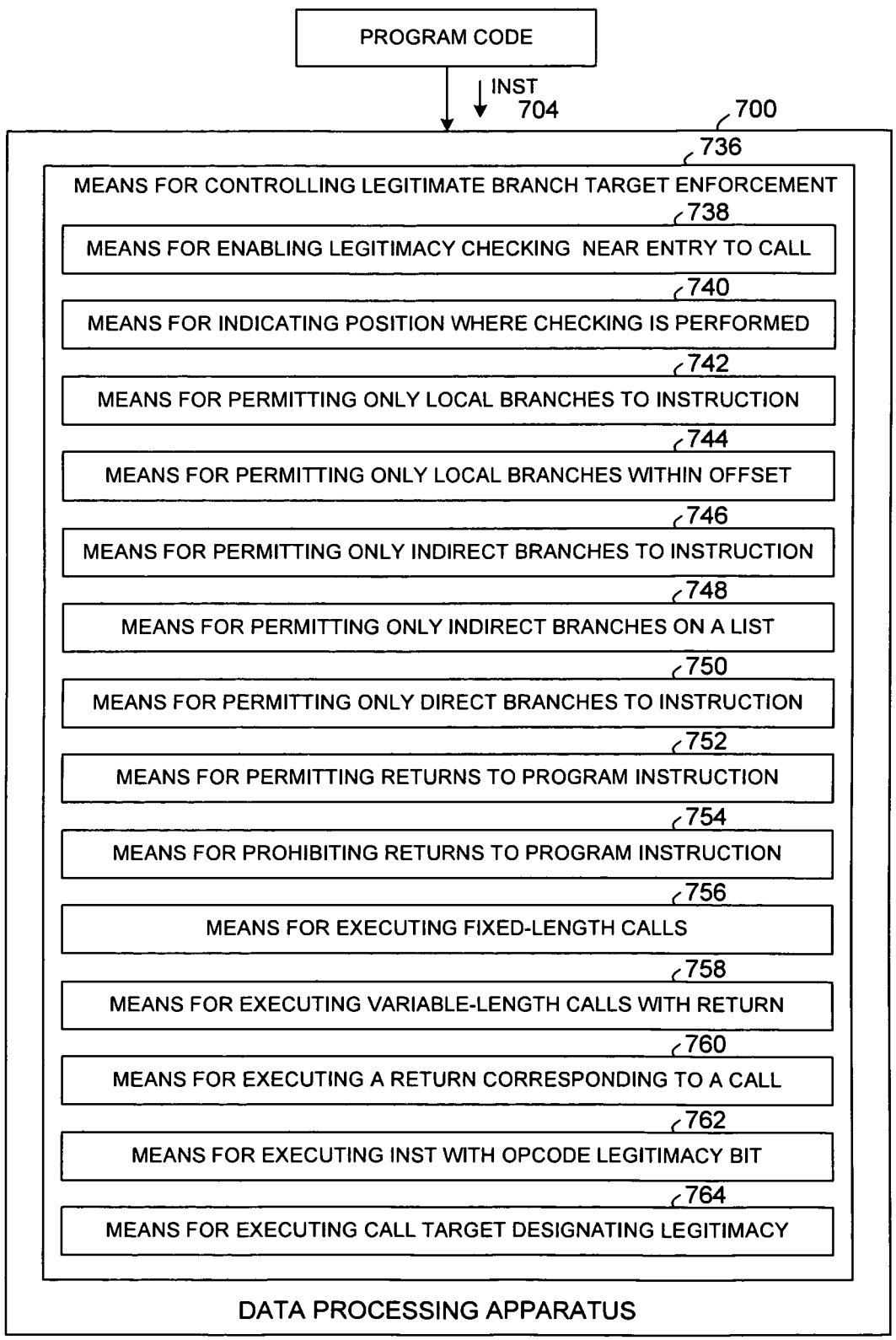
Figure 7C:
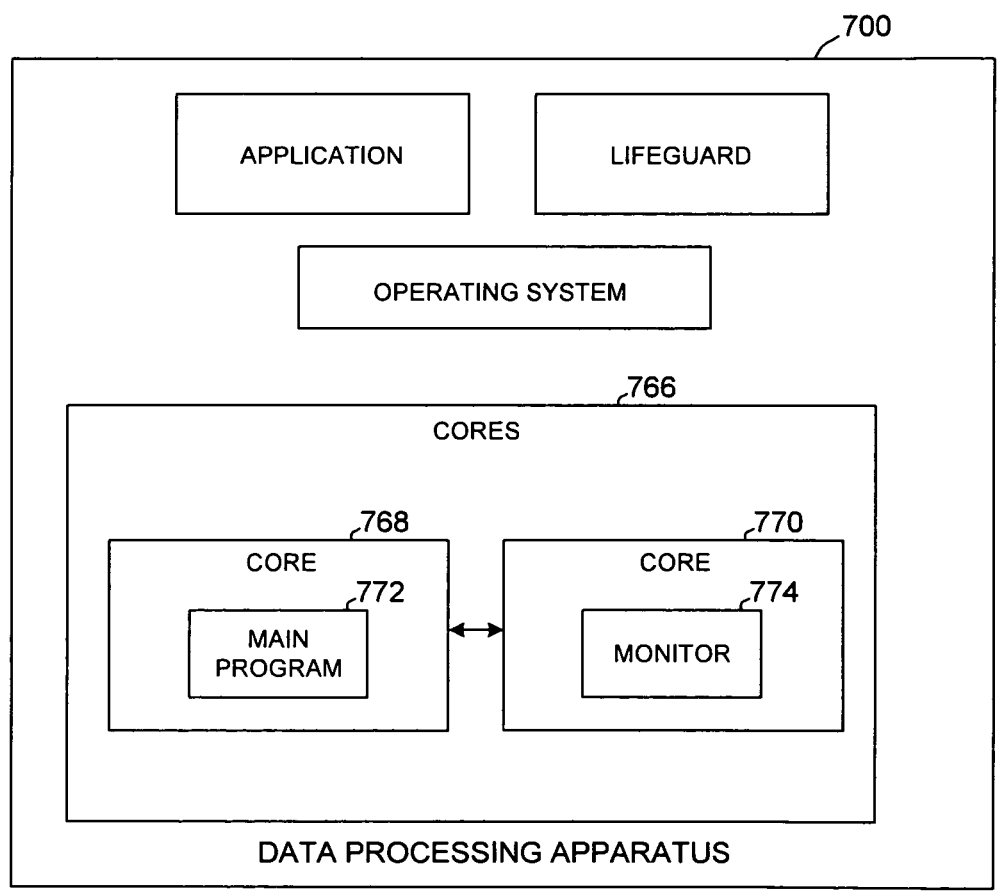

Referring to FIGS. 7A, 7B, and 7C, first, second, and third schematic block diagrams respectively illustrate an embodiment of a data processing apparatus 700 for usage in ensuring program code can only be used for a designed purpose and not exploited by malware in a data processing system. The data processing apparatus 700 can comprise means 702 for executing a program instruction, and means 706 for distinguishing whether the program instruction 704 is a legitimate branch instruction or a non-legitimate branch instruction.

In some embodiments of the data processing apparatus 700, the means 706 for distinguishing whether the program instruction 704 is a legitimate branch instruction or a non-legitimate branch instruction can comprise one or more of several distinguishing means. For example, the means 706 for distinguishing whether the program instruction 704 is a legitimate branch instruction or a non-legitimate branch instruction can comprise means 710 for distinguishing legitimacy according to whether the program instruction 704 is a predetermined special instruction or within a predetermined special class of instructions designated a legitimate branch target instruction.

In another example, the means 706 for distinguishing whether the program instruction 704 is a legitimate branch instruction or a non-legitimate branch instruction can comprise means 712 for distinguishing legitimacy according to whether the program instruction is a No Operation (NOP) instruction of a legacy instruction set The means 706 for distinguishing whether the program instruction 704 is a legitimate branch instruction or a non-legitimate branch instruction can comprise means 714 for distinguishing legitimacy according to whether the program instruction 704 is a metadata structure indexed by an Instruction Pointer (IP) wherein the metadata structure is associated with the instruction pointer (IP).

In some embodiments, the means 706 for distinguishing whether the program instruction 704 is a legitimate branch instruction or a non-legitimate branch instruction can comprise means 716 for distinguishing legitimacy according to whether the program instruction 704 is a single-bit legitimate branch target metadata designating that the program instruction 704 is permitted to be a branch target.

In a variety of embodiments, the means 706 for distinguishing whether the program instruction 704 is a legitimate branch instruction or a non-legitimate branch instruction can comprise means 718 for distinguishing legitimacy according to whether the program instruction 704 is a small dense metadata indexed by an instruction pointer (IP) wherein the small dense metadata is a bit per instruction pointer (IP).

In a range of embodiments, the means 706 for distinguishing whether the program instruction 704 is a legitimate branch instruction or a non-legitimate branch instruction can comprise means 720 for distinguishing legitimacy according to a metadata structure comprising a list of instruction pointer (IP) indicative of the only instruction pointer (IP) that are allowed to branch to a location, the list comprising branch-from Instruction Pointers (IPs) or classes of Instruction Pointers (IPs).

In different embodiments, the means 706 for distinguishing whether the program instruction 704 is a legitimate branch instruction or a non-legitimate branch instruction can comprise means 722 for distinguishing legitimacy according to in-band memory metadata comprising a bit in each instruction operation code (opcode).

In diverse embodiments, the means 706 for distinguishing whether the program instruction 704 is a legitimate branch instruction or a non-legitimate branch instruction can comprise means 724 for distinguishing legitimacy according to in-band memory metadata comprising identification of specific legitimate branch target instructions.

In further embodiments, the means 706 for distinguishing whether the program instruction 704 is a legitimate branch instruction or a non-legitimate branch instruction can comprise means 726 for distinguishing legitimacy according to out-of-band memory metadata comprising identification of instruction tags and/or a branch-froms.

In additional embodiments, the means 706 for distinguishing whether the program instruction 704 is a legitimate branch instruction or a non-legitimate branch instruction can comprise means 728 for distinguishing legitimacy out-of-line via a thread separate from a thread executing the means 702 for executing a program instruction 704.

In various embodiments, the data processing apparatus 700 can further comprise means 730 for executing a trap and/or exception in response to a branch made to a program instruction 704 that is not a legitimate branch instruction.

In some embodiments, the data processing apparatus 700 can further comprise means 732 for selecting an operating mode, and means 734 for enabling trap and/or exception in response to a branch made to a program instruction 704 that is not a legitimate branch instruction.

In some embodiments of the data processing apparatus 700 can further comprise means 736 for controlling legitimate branch target enforcement including one or more of several controlling means 736. For example, the controlling means 736 can comprise means 738 for enabling checking whether the program instruction 704 is a legitimate branch instruction or a non-legitimate branch instruction within predetermined functions proximal to an entry point for a function call, and operable to disable checking on return from the function.

In another example, the controlling means 736 can comprise means 740 for indicating implicitly a position where checking of whether the program instruction 704 is a legitimate branch instruction or a non-legitimate branch instruction is performed via out-of-band memory metadata.

In various embodiments, the controlling means 736 can comprise one or more of several means for performing different aspects of functionality. For example, the controlling means 736 can further comprise means 742 for permitting only local branches to the program instruction 704. Or in a more specific functionality, the controlling means 736 can further comprise means 744 for permitting only local branches to the program instruction wherein locality is specified as an instruction pointer (IP)-relative branch within a predetermined offset.

In further examples, the controlling means 736 can comprise one or more of several means for performing different aspects of functionality relating to branching. For example, the controlling means 736 can further comprise means 746 for permitting only indirect branches to the program instruction 704. Or in a more specific functionality, the controlling means 736 can further comprise means 748 for permitting only indirect branches to the program instruction 704, wherein permitted indirect branch instructions are contained in a list. The controlling means 736 can also comprise means 750 for permitting only direct branches to the program instruction 704.

In additional examples, the controlling means 736 can comprise one or more of several means for performing different aspects of functionality relating to returns. For example, the controlling means 736 can further comprise means 752 for permitting returns to the program instruction 704. Conversely, the controlling means 736 can comprise means 754 for prohibiting returns to the program instruction 704.

In various embodiments, the controlling means 736 can comprise one or more of several means for executing instructions in accordance with different aspects of functionality. For example, the controlling means 736 can further comprise means 756 for executing instructions comprising at least one fixed length CALL instruction wherein a return instruction pointer (IP) is decremented by an instruction width and checking for presence of a CALL instruction is performed.

In a related functionality, the controlling means 736 can further comprise means 758 for executing instructions comprising at least one variable length CALL instruction wherein an instruction pointer (IP) of a CALL instruction is recorded and a RETurn instruction associated with the CALL instruction ensures position of the CALL instruction before incrementing the instruction pointer (IP) to resume execution after the CALL instruction.

With regard to the functionality of returning from a CALL instruction, the controlling means 736 can further comprise means 760 for executing a RETurn instruction corresponding to a CALL instruction, wherein the data processing apparatus 700 further comprises a list of locations from which a RETurn is permitted.

In some embodiments, the controlling means 736 can further comprise means 762 for executing a program instruction 704 comprising an operation code (opcode) field including a branch-from bit designating whether the program instruction 704 is a legitimate branch target that is marked/not-marked as read-only executable code.

In other example embodiments, the controlling means 736 can further comprise means 764 for executing a program instruction 704 comprising a CALL target instruction designating that the program instruction 704 is a legitimate branch target.

Referring to FIG. 7C, an embodiment of the data processing apparatus 700 can comprise a plurality of execution cores 766 comprising at least a first core 768 operable to run a main program 772 comprising the program instruction 704 and a second core 770. The data processing apparatus 700 can further comprise monitoring means 774 for distinguishing whether the program instruction 704 is a legitimate branch instruction or a non-legitimate branch instruction out-of-line from execution of the main program 772, the monitoring means operable to run on the second core 770.

Terms "substantially", "essentially", or "approximately", that may be used herein, relate to an industry-accepted variability to the corresponding term. Such an industry-accepted variability ranges from less than one percent to twenty percent and corresponds to, but is not limited to, materials, shapes, sizes, functionality, values, process variations, and the like. The term "coupled", as may be used herein, includes direct coupling and indirect coupling via another component or element where, for indirect coupling, the intervening component or element does not modify the operation. Inferred coupling, for example where one element is coupled to another element by inference, includes direct and indirect coupling between two elements in the same manner as "coupled".

The illustrative pictorial diagrams depict structures and process actions in a manufacturing process. Although the particular examples illustrate specific structures and process acts, many alternative implementations are possible and commonly made by simple design choice. Manufacturing actions may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, shapes, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

The invention claimed is:

1. A processor comprising:
   execution logic configured for executing one or more instructions of an instruction set architecture that executes in-line wherein the one or more instructions have an instruction encoding that specifies at least one opcode bit defining whether an instruction is a legitimate branch target; and
   code integrity logic configured for detecting a branch in program execution, determining whether a next instruction following a branch is a legitimate branch target according to the at least one opcode bit defining whether the instruction is a legitimate branch target, and if the next instruction following the branch is not a legitimate branch target, initiating at least one enforcement response, wherein the code integrity logic includes at least
   code integrity logic configured for determining whether a next instruction following a branch is a legitimate branch target based at least partially on tagging including at least one metadata indexed by an Instruction Pointer (IP) that indicates execution of the one or more instructions wherein the at least one metadata includes one or more bits per instruction pointer, the tagging specifying whether the next instruction following the branch is a legitimate branch target; and
   enforcement logic configured for controlling legitimate branch target enforcement and configured for recognizing and executing one or more instructions that control at least one selectable operating mode that enables or disables legitimate branch target enforcement, wherein the at least one selectable operating mode includes at least (1) permitting only local branches to the next instruction following the branch, (2) permitting only local branches to the next instruction following the branch wherein locality is specified as an instruction pointer (IP)-relative branch within a predetermined offset, (3) permitting indirect branches to the next instruction following the branch, (4) prohibiting indirect branches to the next instruction following the branch, and (5) permitting only indirect branches to the next instruction following the branch, wherein a metadata structure accessible to the processor includes at least one list of permitted indirect branch instructions.

2. The processor according to claim 1 wherein the code integrity logic configured for detecting a branch in program execution, determining whether a next instruction following a branch is a legitimate branch target according to the at least one opcode bit defining whether the instruction is a legitimate branch target, and if the next instruction following the branch is not a legitimate branch target, initiating at least one enforcement response comprises:

code integrity logic configured for determining whether a next instruction following a branch is a legitimate branch target based at least partially on tagging including at least one bit in the one or more instructions that specifies whether the next instruction following the branch is a legitimate branch target.

3. The processor according to claim 1 wherein the code integrity logic configured for detecting a branch in program execution, determining whether a next instruction following a branch is a legitimate branch target according to the at least one opcode bit defining whether the instruction is a legitimate branch target, and if the next instruction following the branch is not a legitimate branch target, initiating at least one enforcement response comprises:

code integrity logic configured for determining whether a next instruction following a branch is a legitimate branch target based at least partially on tagging including at least a predetermined special instruction or inclusion in a predetermined special class of instructions designated a legitimate branch target instruction that specifies whether the next instruction following the branch is a legitimate branch target.

4. The processor according to claim 1 wherein the code integrity logic configured for detecting a branch in program execution, determining whether a next instruction following a branch is a legitimate branch target according to the at least one opcode bit defining whether the instruction is a legitimate branch target, and if the next instruction following the branch is not a legitimate branch target, initiating at least one enforcement response comprises:

code integrity logic configured for determining whether a next instruction following a branch is a legitimate branch target based at least partially on tagging including at least an operation code specifying a No Operation (NOP) instruction of a legacy instruction set that specifies whether the next instruction following the branch is a legitimate branch target.

5. The processor according to claim 1 wherein the code integrity logic configured for detecting a branch in program execution, determining whether a next instruction following a branch is a legitimate branch target according to the at least one opcode bit defining whether the instruction is a legitimate branch target, and if the next instruction following the branch is not a legitimate branch target, initiating at least one enforcement response comprises:

code integrity logic configured for determining whether a next instruction following a branch is a legitimate branch target based at least partially on tagging including at least a metadata structure indexed by an Instruction Pointer (IP) that indicates execution of the legitimate branch target, the tagging specifying whether the next instruction following the branch is a legitimate branch target.

6. The processor according to claim 1 wherein the code integrity logic configured for detecting a branch in program execution, determining whether a next instruction following a branch is a legitimate branch target according to the at least one opcode bit defining whether the instruction is a legitimate branch target, and if the next instruction following the branch is not a legitimate branch target, initiating at least one enforcement response comprises:

code integrity logic configured for determining whether a next instruction following a branch is a legitimate branch target based at least partially on tagging including at least one or more single-bit legitimate branch target metadata designating that the one or more instructions is permitted to be a branch target, the tagging specifying whether the next instruction following the branch is a legitimate branch target.

7. The processor according to claim 1 wherein the code integrity logic configured for detecting a branch in program execution, determining whether a next instruction following a branch is a legitimate branch target according to the at least one opcode bit defining whether the instruction is a legitimate branch target, and if the next instruction following the branch is not a legitimate branch target, initiating at least one enforcement response comprises:

code integrity logic configured for determining whether a next instruction following a branch is a legitimate branch target based at least partially on tagging including one or more metadata structures including at least one list of Instruction Pointers (IPs) that indicate execution of the one or more instructions and are indicative of Instruction Pointers (IPs) allowed to branch to a predetermined location, the at least one list including at least one of branch-from Instruction Pointers (IPs) or classes of Instruction Pointers (IPs), the tagging specifying whether the next instruction following the branch is a legitimate branch target.

8. The processor according to claim 1 wherein the code integrity logic configured for detecting a branch in program execution, determining whether a next instruction following a branch is a legitimate branch target according to the at least one opcode bit defining whether the instruction is a legitimate branch target, and if the next instruction following the branch is not a legitimate branch target, initiating at least one enforcement response comprises:

code integrity logic configured for determining whether a next instruction following a branch is a legitimate branch target based at least partially on tagging including at least in-band metadata including at least one bit in an instruction operation code (opcode), the tagging specifying whether the next instruction following the branch is a legitimate branch target.

9. The processor according to claim 1 wherein the code integrity logic configured for detecting a branch in program execution, determining whether a next instruction following a branch is a legitimate branch target according to the at least one opcode bit defining whether the instruction is a legitimate branch target, and if the next instruction following the branch is not a legitimate branch target, initiating at least one enforcement response comprises:

code integrity logic configured for determining whether a next instruction following a branch is a legitimate branch target based at least partially on tagging including at least in-band memory metadata including identification of specific legitimate branch target instructions, the tagging specifying whether the next instruction following the branch is a legitimate branch target.

10. The processor according to claim 1 wherein the code integrity logic configured for detecting a branch in program execution, determining whether a next instruction following a branch is a legitimate branch target according to the at least one opcode bit defining whether the instruction is a legitimate branch target, and if the next instruction following the branch is not a legitimate branch target, initiating at least one enforcement response comprises:
  code integrity logic configured for determining whether a next instruction following a branch is a legitimate branch target based at least partially on tagging including at least out-of-band memory metadata including identification of at least one of instruction tags or branch-froms, the tagging specifying whether the next instruction following the branch is a legitimate branch target.

11. The processor according to claim 1 wherein the code integrity logic configured for detecting a branch in program execution, determining whether a next instruction following a branch is a legitimate branch target according to the at least one opcode bit defining whether the instruction is a legitimate branch target, and if the next instruction following the branch is not a legitimate branch target, initiating at least one enforcement response further comprises:
  response logic configured for initiating at least one enforcement response including at least one of a trap or an exception for a branch made to an executing instruction that is not a legitimate branch target.

12. The processor according to claim 1 wherein the code integrity logic configured for detecting a branch in program execution, determining whether a next instruction following a branch is a legitimate branch target according to the at least one opcode bit defining whether the instruction is a legitimate branch target, and if the next instruction following the branch is not a legitimate branch target, initiating at least one enforcement response further comprises:
  enforcement logic configured for initiating at least one enforcement response according to at least one selectable operating mode including at least one of a trap or an exception if enabled by the selectable operating mode.

13. The processor according to claim 1 wherein the code integrity logic configured for detecting a branch in program execution, determining whether a next instruction following a branch is a legitimate branch target according to the at least one opcode bit defining whether the instruction is a legitimate branch target, and if the next instruction following the branch is not a legitimate branch target, initiating at least one enforcement response further comprises:
  enforcement logic configured for controlling legitimate branch target enforcement and configured for recognizing and executing one or more instructions that control an operating mode that enables or disables legitimate branch target enforcement by setting a bit in a control register.

14. The processor according to claim 1 wherein the code integrity logic configured for detecting a branch in program execution, determining whether a next instruction following a branch is a legitimate branch target according to the at least one opcode bit defining whether the instruction is a legitimate branch target, and if the next instruction following the branch is not a legitimate branch target, initiating at least one enforcement response further comprises:
  enforcement logic configured for controlling legitimate branch target enforcement and configured for enabling checking whether the next instruction following the branch is a legitimate branch target within predetermined functions proximal to an entry point for a function call, and configured for disabling checking on return from the function.

15. The processor according to claim 1 wherein the code integrity logic configured for detecting a branch in program execution, determining whether a next instruction following a branch is a legitimate branch target according to the at least one opcode bit defining whether the instruction is a legitimate branch target, and if the next instruction following the branch is not a legitimate branch target, initiating at least one enforcement response further comprises:
  enforcement logic configured for controlling legitimate branch target enforcement and configured for implicitly indicating a position designated by an instruction pointer where checking of whether the next instruction following the branch is a legitimate branch target is performed via out-of-band memory metadata.

16. The processor according to claim 1 wherein the code integrity logic configured for detecting a branch in program execution, determining whether a next instruction following a branch is a legitimate branch target according to the at least one opcode bit defining whether the instruction is a legitimate branch target, and if the next instruction following the branch is not a legitimate branch target, initiating at least one enforcement response comprises:
  enforcement logic configured for controlling legitimate branch target enforcement and configured for determining whether the next instruction following the branch is a legitimate branch target out-of-line via a thread separate from a thread executing the legitimate branch target.

17. The processor according to claim 1 further comprising:
  a plurality of execution cores including at least a first core configured to run a main program including the next instruction following the branch and a second core; and
  a monitoring program configured for running on the second core and configured for distinguishing whether the next instruction following the branch is a legitimate branch target out-of-line from execution of the main program.

18. The processor according to claim 1 wherein the code integrity logic configured for detecting a branch in program execution, determining whether a next instruction following a branch is a legitimate branch target according to the at least one opcode bit defining whether the instruction is a legitimate branch target, and if the next instruction following the branch is not a legitimate branch target, initiating at least one enforcement response comprises:
  code integrity logic configured for determining whether a detected branch is branching to a legitimate instruction boundary.

19. The processor according to claim 1 wherein the code integrity logic configured for detecting a branch in program execution, determining whether a next instruction following a branch is a legitimate branch target according to the at least one opcode bit defining whether the instruction is a legitimate branch target, and if the next instruction following the branch is not a legitimate branch target, initiating at least one enforcement response comprises:
  code integrity logic configured for determining whether a detected branch is branching to a legitimate instruction boundary based at least partially on one or more bits in the target instruction indicating a legitimate instruction boundary.

20. The processor according to claim 1 wherein the code integrity logic configured for detecting a branch in program execution, determining whether a next instruction following a branch is a legitimate branch target according to the at least one opcode bit defining whether the instruction is a legitimate branch target, and if the next instruction following the branch is not a legitimate branch target, initiating at least one enforcement response comprises:
  code integrity logic configured for determining whether a detected branch is branching to a legitimate instruction boundary based at least partially on one or more in-line multiple-instruction templates indicating which instruction block (i-block) chunks within an i-block are legitimate instruction beginning points.

21. The processor according to claim 1 wherein the next instruction following the branch includes:
  at least one of a next instruction in an execution stream or an instruction targeted by at least one of a branch, a conditional branch, an unconditional branch, a direct branch, an indirect branch, a goto, a jump, an indirect jump, a call, a direct call, an indirect call, a return, a return from interrupt, or a return from exception.

22. A processor comprising:
  execution logic configured for executing one or more instructions of an instruction set architecture that executes in-line wherein the one or more instructions have an instruction encoding that specifies at least one opcode bit defining whether an instruction is a legitimate branch target;
  code integrity logic configured for detecting a branch in program execution, determining whether a next instruction following a branch is a legitimate branch target according to the at least one opcode bit defining whether the instruction is a legitimate branch target, wherein the code integrity logic includes at least
    code integrity logic configured for determining whether a next instruction following a branch is a legitimate branch target based at least partially on tagging including at least one metadata indexed by an Instruction Pointer (IP) that indicates execution of the one or more instructions wherein the at least one metadata includes one or more bits per instruction pointer, the tagging specifying whether the next instruction following the branch is a legitimate branch target; and
  enforcement logic configured for controlling legitimate branch target enforcement and configured for recognizing and executing one or more instructions that control at least one selectable operating mode that enables or disables legitimate branch target enforcement, wherein the at least one selectable operating mode includes at least (1) permitting only local branches to the next instruction following the branch, (2) permitting only local branches to the next instruction following the branch wherein locality is specified as an instruction pointer (IP)-relative branch within a predetermined offset, (3) permitting indirect branches to the next instruction following the branch, (4) prohibiting indirect branches to the next instruction following the branch, and (5) permitting only indirect branches to the next instruction following the branch, wherein a metadata structure accessible to the processor includes at least one list of permitted indirect branch instructions; and
  response logic configured for responding when the next instruction following the branch is not a legitimate branch target based at least partly on the instruction encoding that specifies at least one opcode bit defining whether an instruction is a legitimate branch target, initiating at least one enforcement response.

23. The processor according to claim 22, wherein the response logic configured for responding when the next instruction following the branch is not a legitimate branch target based at least partly on the instruction encoding that specifies at least one opcode bit defining whether an instruction is a legitimate branch target, initiating at least one enforcement response further includes:
  enforcement logic configured for controlling legitimate branch target enforcement and configured for recognizing and executing one or more instructions specified in the instruction set configured for machine execution on the processor and control at least one operating mode that enables or disables legitimate branch target enforcement.

24. The processor according to claim 22, wherein the response logic configured for responding when the next instruction following the branch is not a legitimate branch target based at least partly on the instruction encoding that specifies at least one opcode bit defining whether an instruction is a legitimate branch target, initiating at least one enforcement response further includes:
  enforcement logic configured for controlling legitimate branch target enforcement and configured for recognizing and executing one or more instructions specified in the instruction set configured for machine execution on the processor and control at least one operating mode that enables or disables legitimate branch target enforcement by setting a bit in a control register.

25. The processor according to claim 22, wherein the response logic configured for responding when the next instruction following the branch is not a legitimate branch target based at least partly on the instruction encoding that specifies at least one opcode bit defining whether an instruction is a legitimate branch target, initiating at least one enforcement response further includes:
  enforcement logic configured for controlling legitimate branch target enforcement and configured for enabling checking whether the next instruction following the branch is a legitimate branch target within predetermined functions proximal to an entry point for a function call, and configured for disabling checking on return from the function call.

26. The processor according to claim 22, wherein the response logic configured for responding when the next instruction following the branch is not a legitimate branch target based at least partly on the instruction encoding that specifies at least one opcode bit defining whether an instruction is a legitimate branch target, initiating at least one enforcement response further includes:
  enforcement logic including out-of-band metadata configured for controlling legitimate branch target enforcement and configured for implicitly indicating a position designated by an instruction pointer where checking of whether the next instruction following the branch is a legitimate branch target.

27. The processor according to claim 22, wherein the response logic configured for responding when the next instruction following the branch is not a legitimate branch target based at least partly on the instruction encoding that specifies at least one opcode bit defining whether an instruction is a legitimate branch target, initiating at least one enforcement response further includes:
  enforcement logic configured for controlling legitimate branch target enforcement and configured for determining whether the next instruction following the branch is a legitimate branch target out-of-line via a thread separate from a thread executing the next instruction following the branch.

28. A processor comprising:

a plurality of execution cores including at least a first core and a second core;

execution logic configured for executing one or more instructions of an instruction set architecture that executes in-line wherein the one or more instructions have an instruction encoding that specifies at least one opcode bit defining whether an instruction is a legitimate branch target, the first core configured for running a main program including at least one executing instruction of the one or more instructions in the instruction set, wherein the execution logic includes at least code integrity logic configured for determining whether a next instruction following a branch is a legitimate branch target based at least partially on tagging including at least one metadata indexed by an Instruction Pointer (IP) that indicates execution of the one or more instructions wherein the at least one metadata includes one or more bits per instruction pointer, the tagging specifying whether the next instruction following the branch is a legitimate branch target; and enforcement logic configured for controlling legitimate branch target enforcement and configured for recognizing and executing one or more instructions that control at least one selectable operating mode that enables or disables legitimate branch target enforcement, wherein the at least one selectable operating mode includes at least (1) permitting only local branches to the next instruction following the branch, (2) permitting only local branches to the next instruction following the branch wherein locality is specified as an instruction pointer (IP)-relative branch within a predetermined offset, (3) permitting indirect branches to the next instruction following the branch, (4) prohibiting indirect branches to the next instruction following the branch, and (5) permitting only indirect branches to the next instruction following the branch, wherein a metadata structure accessible to the processor includes at least one list of permitted indirect branch instructions; and a monitoring program configured for running on the second core and configured for determining code integrity, out-of-line from execution of the main program, including at least detecting a branch in program execution, determining whether a next instruction following a branch is a legitimate branch target according to the at least one opcode bit defining whether the instruction is a legitimate branch target, and if the next instruction following the branch is not a legitimate branch target, initiating at least one enforcement response.

29. A processor comprising:

an instruction decoder configured for decoding one or more instructions in an instruction set of an instruction set architecture that defines the instruction set by instructions that execute in-line wherein the one or more instructions have an instruction encoding that specifies at least one opcode bit defining whether an instruction is a legitimate branch target;

execution logic configured for executing the decoded one or more instructions in the instruction set configured for execution on the processor; and code integrity logic configured for detecting a branch in program execution, determining whether a next instruction following a branch is a legitimate branch target according to the at least one opcode bit defining whether the instruction is a legitimate branch target, and if the next instruction following the branch is not a legitimate branch target, initiating at least one enforcement response, wherein the code integrity logic includes at least code integrity logic configured for determining whether a next instruction following a branch is a legitimate branch target based at least partially on tagging including at least one metadata indexed by an Instruction Pointer (IP) that indicates execution of the one or more instructions wherein the at least one metadata includes one or more bits per instruction pointer, the tagging specifying whether the next instruction following the branch is a legitimate branch target; and enforcement logic configured for controlling legitimate branch target enforcement and configured for recognizing and executing one or more instructions that control at least one selectable operating mode that enables or disables legitimate branch target enforcement, wherein the at least one selectable operating mode includes at least (1) permitting only local branches to the next instruction following the branch, (2) permitting only local branches to the next instruction following the branch wherein locality is specified as an instruction pointer (IP)-relative branch within a predetermined offset, (3) permitting indirect branches to the next instruction following the branch, (4) prohibiting indirect branches to the next instruction following the branch, and (5) permitting only indirect branches to the next instruction following the branch, wherein a metadata structure accessible to the processor includes at least one list of permitted indirect branch instructions.

* * * * *